(12) United States Patent
Matos

(10) Patent No.: US 7,991,516 B2
(45) Date of Patent: Aug. 2, 2011

(54) APPARATUS FOR AIRFIELD MANAGEMENT

(76) Inventor: Jeffrey A. Matos, New Rochelle, NY (US)

( * ) Notice: Subject to any disclaimer, the term of this patent is extended or adjusted under 35 U.S.C. 154(b) by 912 days.

(21) Appl. No.: 11/899,048

(22) Filed: Sep. 4, 2007

(65) Prior Publication Data

US 2008/0201024 A1 Aug. 21, 2008

(51) Int. Cl.
*G06D 1/00* (2006.01)
(52) U.S. Cl. .............. 701/2; 701/4; 701/10; 701/16; 701/22; 701/29; 334/7; 244/185
(58) Field of Classification Search ........... 701/4, 10, 701/16, 22, 24, 29, 120, 207; 345/7; 244/185
See application file for complete search history.

(56) References Cited

U.S. PATENT DOCUMENTS

| | | | | |
|---|---|---|---|---|
| RE26,064 E | * | 7/1966 | Bond et al. ............... | 244/185 |
| 3,925,750 A | * | 12/1975 | Gilbert et al. ............ | 340/961 |
| 4,516,125 A | * | 5/1985 | Schwab et al. ........... | 342/36 |
| 5,111,400 A | | 5/1992 | Yoder | |
| 5,321,615 A | * | 6/1994 | Frisbie et al. ............ | 701/24 |
| 5,519,618 A | * | 5/1996 | Kastner et al. ........... | 701/120 |
| 5,659,475 A | * | 8/1997 | Brown .................... | 701/120 |
| 5,684,496 A | * | 11/1997 | Parus ..................... | 345/7 |
| 5,736,955 A | * | 4/1998 | Roif ...................... | 342/33 |
| 6,055,477 A | * | 4/2000 | McBurney et al. ....... | 701/207 |
| 6,182,005 B1 | | 1/2001 | Pilley et al. | |
| 6,262,679 B1 | | 7/2001 | Tran | |
| 6,278,965 B1 | * | 8/2001 | Glass et al. ............. | 703/22 |
| 6,380,869 B1 | | 4/2002 | Simon et al. | |
| 6,469,655 B1 | | 10/2002 | Franke et al. | |
| 6,845,302 B2 | * | 1/2005 | Moretto ................. | 701/3 |
| 6,950,037 B1 | | 9/2005 | Clavier et al. | |
| 6,965,816 B2 | * | 11/2005 | Walker .................. | 701/16 |
| RE39,618 E | * | 5/2007 | Levine .................. | 701/29 |
| 7,840,317 B2 | * | 11/2010 | Matos et al. ............ | 701/16 |
| 2004/0006412 A1 | * | 1/2004 | Doose et al. ........... | 701/10 |
| 2005/0187677 A1 | * | 8/2005 | Walker .................. | 701/16 |
| 2005/0234608 A1 | * | 10/2005 | Jaillant ................. | 701/4 |
| 2006/0032978 A1 | * | 2/2006 | Matos et al. ........... | 244/118.5 |

* cited by examiner

*Primary Examiner* — James P Trammell
*Assistant Examiner* — McDieunel Marc
(74) *Attorney, Agent, or Firm* — Karl F. Milde, Jr.; Eckert Seamans Cherin & Mellott, LLC

(57) ABSTRACT

A system for supervising the landing of an aircraft by a supervisor in a control station, each of the aircraft being incapable of being controlled by any personnel onboard, the system comprises a control station and onboard aircraft control apparatus. The station includes an input device, responsive to the supervisor, for producing a control signal for controlling the landing of the aircraft; and a transmitting device, coupled to the input device, for communication with the aircraft. The aircraft apparatus includes a receiving device for communication with the station; a logic device, coupled to the receiving device, for controlling the aircraft which is programmed to pilot the aircraft to the vicinity of the airfield. The control signal is selected by the supervisor, based on the supervisor's observations of the aircraft and is transmitted to the logic device; in response thereto, the logic device controls the aircraft.

89 Claims, 14 Drawing Sheets

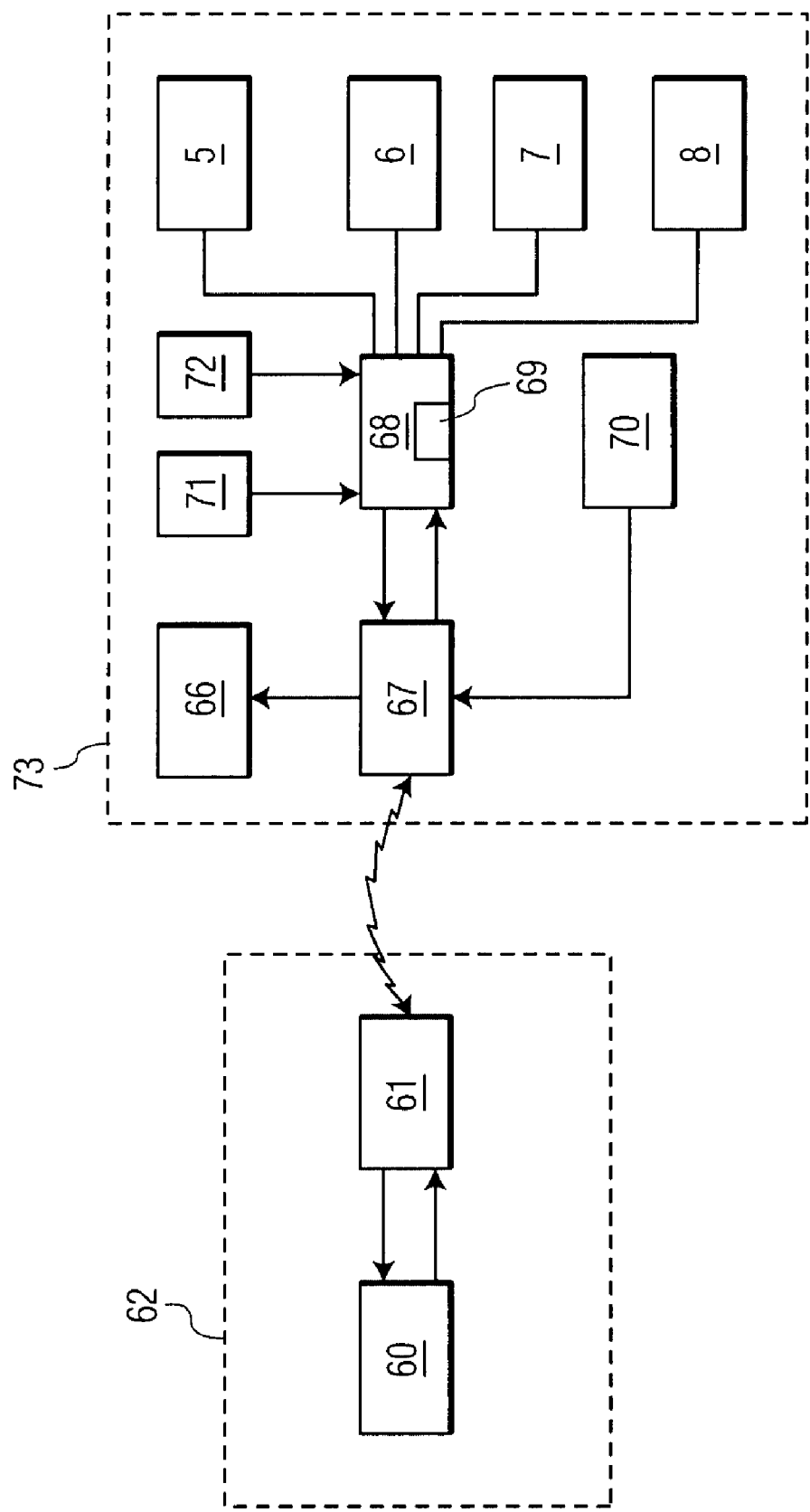

APPARATUS FOR AIRFIELD MANAGEMENT

CROSS-REFERENCE TO RELATED APPLICATIONS

This application incorporates by reference U.S. Pat. No. 6,917,863 and each of U.S. patent application Ser. Nos. 10/919,169, 11/373,712, 11/385,270 and 11/388,311.

BACKGROUND OF THE INVENTION

The inventions herein concern the air traffic (and associated ground aircraft traffic) management for
a) hijacked aircraft;
b) aircraft in which an impaired pilot or pilots is/are no longer capable of flying the aircraft;
c) airfields used by unmanned aerial vehicles;
d) airfields not manned by an air traffic controller;
e) airfields and aircraft with capable onboard pilots wherein, for reasons discussed hereinbelow it may be desirable to have a supervisor or a computational device (also referred to as "logic device") controlling a landing and/or takeoff; and
f) combinations of a)-e).

Emphasis is placed on the management of hijacked aircraft in which control has been taken away from the onboard pilot, as discussed in U.S. Pat. No. 6,917,863 and other referenced patents and applications. Nevertheless, it will be clear that the operating principles for other remotely controlled or controllable aircraft are parallel in nature—or identical.

One way of maximizing security for the above-referenced hijacking prevention system is to minimize the opportunity for an outside, ill-intentioned agent to gain (or attempt to gain) control over a remotely controlled aircraft. Parameters which may be minimized are:
a) the amount of information which the remotely guided aircraft can receive;
b) the total time during which remote guidance is allowed; and
c) the distance over which such information is transmitted.

Methods c) of minimizing the distance over which information is transmitted include the use of an interceptor aircraft, and the use of a high output transmitter to transmit commands and a low sensitivity receiver. These are discussed in the U.S. Pat. No. 6,917,863 and in application Ser. No. 10/919,169.

Other methods techniques for minimizing interference include the use of highly directional signal transmission, and encoding and encryption techniques, also discussed in U.S. Pat. No. 6,917,863 and in application Ser. No. 10/919,169.

Considering a) and b) above:

The theoretic extreme case is one in which there is no remote guidance whatsoever, i.e. in which the flight, from the time of button press until the time of landing, runs entirely on autopilot. The problems with such a system are:
a) inability to navigate around bad weather en-route to the secure airfield (SAF);
b) inability to make last minute corrections due to unanticipated turbulence, microbursts, wind shear or other unfavorable conditions in the vicinity of the secure airfield; and
c) the fact that the system can be defeated by hijacking multiple aircraft at around the same time and flooding the secure field with arrivals. Two aircraft attempting to land simultaneously, both with essentially identical glide paths, runway assignments and arrival times would collide.

SUMMARY OF THE INVENTION

The present invention discusses methods and systems of remote guidance in which the amount of information exchanged between the hijacked aircraft and an outside source of guidance is minimized.

Possible techniques:

Technique #1) At the time of button press (BP) a hijacked aircraft (HAC) is assigned:
a) a SAF
b) a runway at the SAF;
c) an approach vector (AV), i.e. a direction (e.g. one of eight compass points) from which it approaches the parking orbit (PO);
d) a unique PO, i.e. a circular (or elliptical) orbit, in the vicinity of the SAF; The PO is identified by the coordinates of its center, its radius and its altitude; (or, in the case of an elliptical orbit, the coordinates of the two centers, and the length of each of the semi-major and semi-minor axis; and its altitude) and
e) a semi-unique landing time.

Systems aboard the HAC, at the time of BP, determine the nearest SAF, calculate the expected arrival time at the SAF, add some pre-determined safety margin, and assign a landing time which is the expected arrival time plus the predetermined safety margin. They also assign the runway, glide path and PO.

On arrival at the vicinity of the SAF, the HAC approaches via the direction corresponding to the AV and enters the assigned PO. The determination of last orbit in the parking pattern occurs automatically, so that the deviation from the assigned landing time is minimized. After the last orbit, the HAC moves from PO to the glide path (GP) for the assigned runway and lands UNLESS the HAC receives a "landing inhibit" (LI) signal. The LI signal would be sent only if another aircraft was approaching the same runway or glide path at the same time. The LI signal would cause the HAC to remain in the PO for one more orbit. The HAC would land after the additional orbit, unless it receives another LI signal.

Using Technique #1, an HAC can land:
a) in an extreme case, without receiving any remote guidance; and
b) in a less extreme case, having its only guidance consist of one or more LI signals. The advantage of this approach over that delineated in issued U.S. Pat. No. 6,917,863 and over U.S. patent application Ser. No. 10/919,169 is that the amount of information sent to the HAC, the LI signal, is far less than the amount of information that contains a full set of moment to moment landing commands. The duration of transmission is obviously also far shorter in the case of the LI signal.

The LI signal would ideally be sent from a nearby interceptor aircraft (IAC). Alternatively, the LI signal could be sent from a control tower, a satellite, or a remote control center (RCC) which is not in the vicinity of the SAF. Approaches to the prevention of hacking of the LI signal would be the same as those employed for the prevention of hacking in general, i.e. short range transmissions with high directionality. The advantage of the Technique #1 is that the total time of signal transmission to the HAC is very short (and possibly zero), and the information content is very small.

The flight management systems of potential HACs would be set up to assign semi-unique landing parameters. For example:

Aircraft #XXX might be assigned to runway 2, landing time the nearest to target time of 10, 30 or 50 minutes after the hour;

Aircraft #YYY might be assigned to runway 2, landing time the nearest to target time of 0, 20 or 40 minutes after the hour;

Aircraft #ZZZ might be assigned to runway 1, landing time the nearest to target time of 10, 30 or 50 minutes after the hour; etc.

These assignments could not be entirely unique, since uniqueness would require one SAF/runway/time assignment for each aircraft currently in the air—an impossibility. But the availability of P runways and Q landing times at a particular SAF would mean that the chance of a duplicate assignment of two randomly assigned aircraft is 1/PQ. And, importantly, the case of possible duplication of assigned runway and landing time is dealt with by the possibility of temporarily inhibiting a landing by a LI signal.

The capacity of each SAF is increased by the parking orbits. One stack of POs, with equal radius and identical center points, with aircraft situated every 1000 feet of altitude from 1000 to four thousand feet would accommodate four aircraft, and thereby increase the capacity of a runway by a factor of four. Additional increases in capacity could be achieved by:

a) having each stack have POs with more than one radius (e.g. an 8 mile and a 12 mile radius); and b) having multiple stacks with different center points (e.g. one to the east of the runway, and one to the west).

Obviously, stack geometry would have to be such that no overlap of orbits between stacks is possible.

For J Stacks per runway, each stack having K orbits, at an SAF with P runways, the number of possible orbiting aircraft could be as many as JKP, i.e. J times K times P. For example, a SAF using 2 stacks, each having 4 orbits, for each of 3 runways, could have 24 orbiting aircraft at any one time.

Even so, there is the possibility that random assignment of a PO may result in an identical assignment for two HACs, in the case of multiple hijackings. In the aforementioned example of a SAF with 24 possible POs:

a) the chance that two randomly assigned simultaneously arriving HACs would have the same PO would be 1/24; and b) the chance that three randomly assigned simultaneously arriving HACs would have a duplicate or triplicate assignment would be 35/288 (approximately 12%).

To deal with this possibility, a "change parking orbit assignment" (CPOA) signal could be sent. The source of the signal would be the same as the source of the LI signal. There are a number of possible CPOA signal formats:

a) All of the POs at a SAF could be numbered. A CPOA signal of the first type (CPOA-1) would cause the HAC to approach the PO with the PO identification number which is one greater than the initial assignment. Two consecutive CPOA-1 signals would cause the HAC to approach the PO with the PO number which is two greater than the initially assigned PO;

b) Alternatively, or in addition, a CPOA-2 signal could be a command to enter the PO with the PO identification number which is one less than the initial assignment. (In the case of a SAF with 24 possible POs, a CPOA-2 signal would accomplish what 23 consecutive CPOA-1 signals accomplishes.) Two consecutive CPOA-2 signals would cause the HAC to approach the PO with the PO identification number which is two less than the initially assigned PO.

c) Alternatively, or in addition a CPOA-3 (CPOA-4) signal could cause the HAC to be reassigned to the PO which has an altitude 1000 feet greater (or lower, in the case of CPOA-4) than that of the initially assigned PO;

d) Alternatively, or in addition a CPOA-5 signal could cause the HAC to be reassigned to a PO in a different stack, with an altitude identical to the initially assigned PO;

e) Alternatively, a CPOA-6 signal could specify exactly which of the numbered POs is to be switched to; (In the case of the above example, there would be 24 possible CPOA-6 signals; and f) Alternatively, a CPOA-7 signal could specify the geometry of a not previously delineated PO, i.e. it's center (centers in the case of an elliptical orbit), radius (radii in the case of an elliptical orbit) and altitude.

The need for a CPOA signal would be based on the knowledge that two HACs are headed for the same PO. Such knowledge could be obtained:

a) by visual means: e.g. a person aboard an IAC sees that HAC #1 and HAC #2 are headed for the same PO;

b) by electronic means, i.e.

i) a person aboard an IAC can interrogate an approaching HAC by sending a signal which causes the HAC to transmit its intended PO to the IAC: or ii) the HAC automatically transmits a signal which indicates its intended PO, on approach to the SAF.

A method of automatically assigning POs, for systems which allow transmission of PO assignment signals [such as in the case of b) ii) immediately above], would be:

a) Each PO is numbered, and each HAC occupying a particular PO transmits a signal which indicates that that particular PO is occupied, a POO signal (In the above example, there would be 24 types of POO signals.);

b) A HAC approaching an SAF receives each of the POO signals and assigns itself to an unoccupied PO; and c) That HAC starts transmitting a POO signal corresponding to its particular PO.

Each of the concepts involved in collision avoidance in or near a PO due to "overbooking" of POs could be used for the AV to a PO. AVs could be numbered and policed by either IACs, or distant remotely located pilots. Alternatively, an automatic collision avoidance system for the AVs, with characteristics similar to that described hereinabove for the POs could be operative. Such a system would have "change approach vector assignment" (CAVA) signals analogous to the CPOA signals described hereinabove.

The collision avoidance systems for the POs and for the AVs would require autopilot/flight management computer programs aboard the HAC which allow it to make a transition from one particular PO to another and/or from one particular AV to another.

In summary, Technique #1 involves the minimization of communication with the HAC by using an automated landing which uses a LI signal, if necessary. Variations of Technique #1 involve:

a) the use of CPOA signals;

b) the use of CAVA signals; and c) the use of signals from the HAC which indicate actual or intended PO occupation.

Hybrids of the aforementioned Technique #1 and the 'Methods' of U.S. Pat. No. 6,917,863 and, Ser. No. 10/919, 169 involve using Technique #1 until some very late point in the approach to the runway, and then, for the last very short segment (e.g. 10 to 60 seconds) using an off-aircraft pilot (aboard an interceptor aircraft or ground-based) for the landing.

Technique #2 is similar to technique #1 except that in the case of Technique #2, there is no assignment of a landing time. Instead, the HAC waits in its assigned PO until it receives a landing confirmation (LC) signal from either an IAC or an alternatively located controller.

Technique #2) At the time of button press (BP) a hijacked aircraft (HAC) is assigned:
 a) a SAF
 b) a runway at the SAF;
 c) an approach vector (AV), i.e. a direction (e.g. one of eight compass points) from which it approaches the parking orbit (PO); and
 d) a unique PO, i.e. a circular (or elliptical) orbit, in the vicinity of the SAF; The PO is identified by the coordinates of its center, its radius and its altitude; (or, in the case of an elliptical orbit, the coordinates of the two centers, and the length of each of the semi-major and semi-minor axis; and its altitude).

The IAC (or alternative) controller ("the controller") then selects a particular HAC for landing based on the controller's estimate of the priority of each HAC (which may be based on an estimate of the remaining fuel and of the urgency of the situation within the HAC). The controller then sends a LC signal to the HAC most in need of immediate landing.

Variations of Technique #2 involve:
 a) each of the variations indicated for Technique #1 and
 b) variations in which the controller transmits runway selection information including:
  i) runway assignment, for a system in which there is no initial runway assignment; and
  ii) change of runway assignment, for a system in which there is initial runway assignment, but where the initial runway assignment is deemed to be unsatisfactory;
 c) systems which involve an initial semi-unique landing time assignment, and a LI signal and a LC signal. In this case, the technique is similar to Technique #1 until the LI signal is sent. Thereafter, the HAC remains in the PO until a LC signal is sent to it; and
 d) hybrids with U.S. Pat. No. 6,917,863 and. Ser. No. 10/919,169, in which the approach to the SAF is as indicated herein, but in which the last 10 to 60 seconds of the landing of the HAC are fully controlled by a remote pilot.

Other variations on the aforementioned Technique #1 and #2 include:
 a) systems in which the HAC may receive signals enroute to the SAF to either speed up or slow down, based on the anticipated traffic pattern at the SAF, in the event of multiple hijackings. In a preferred embodiment of the invention such signals would originate from a nearby source, e.g. a nearby interceptor aircraft, using the aforementioned signal security techniques.
 b) systems in which, on arrival at the PO, the aircraft speed is either:
  i) pre-programmed;
  ii) transmitted to the HAC by a signal from a controller; or
  iii) in a "no-controller" system, selected by equipment onboard the HAC;
 c) systems in which two or more aircraft occupy the same PO (e.g. separate by 180 degrees in a circular orbit). In such cases, care would need to be taken to assure that:
  i) the aircraft in a shared PO each had the same speed;
  ii) the aircraft, because of small speed variations were not drifting towards each other; and
  iii) that various collision avoidance procedures could be immediately implemented if necessary including (a) a LC signal, or (b) a signal to change speed. The source of such a signal could be the controller, or a collision avoidance system on the HAC;
 d) systems in which the approaching or orbiting aircraft transmits information to a controller about the quantity of it's remaining fuel supply/amount of remaining fly-time before fuel dissipation. The controller then selects a particular HAC for landing based on the controller's estimate of the priority of each HAC (which may be based on the transmitted information about the amount of remaining fuel [and of the urgency of the situation within the HAC]).
  i) In Technique #2, the controller then sends a LC signal to the aircraft most in need of immediate landing. The controller may also send one or more LI signals to aircraft with greater fuel reserves, if these aircraft were scheduled for landing at the time now re-assigned to a low fuel aircraft;
  ii) In Technique #1, the controller may select which of two or more aircraft (scheduled to land approximately simultaneously) to send a LI signal to based on the transmitted remaining fuel information from each.

The controller could also send a CPOA signal to an aircraft with a low fuel situation, assigning it to an orbit which is either smaller, nearer the runway, lower in altitude or populated by one or more other low velocity aircraft; and
 e) systems in which the approaching or orbiting aircraft transmit information to each other about the quantity of remaining fuel supply/amount of remaining fly-time before fuel dissipation for each aircraft. Each aircraft then is assigned a priority number for landing, based on the remaining fuel/fly-time. The assignment of priority number is by equipment that may be on some or all of the aircraft. The priority numbers may be updated and, if necessary, changed (by the same system that initially assigned them), as the minutes go by before actual landing. The remaining fuel/fly-time determination information may also be used to assign either a lower altitude or lower speed PO, or a PO nearer to the runway.

The aforementioned approaches:
 a) minimize the opportunities for hacking by an unauthorized person;
 b) minimize the opportunities for "jamming" remote pilot/controller signals by an unauthorized person.

BRIEF DESCRIPTION OF THE DRAWINGS

FIG. 3B shows a block diagram of an automatically controlled system for controlling the landing of a plurality of aircraft on which an onboard person may share control of the aircraft.

DETAILED DESCRIPTION OF THE PREFERRED EMBODIMENTS

Figure 1A:
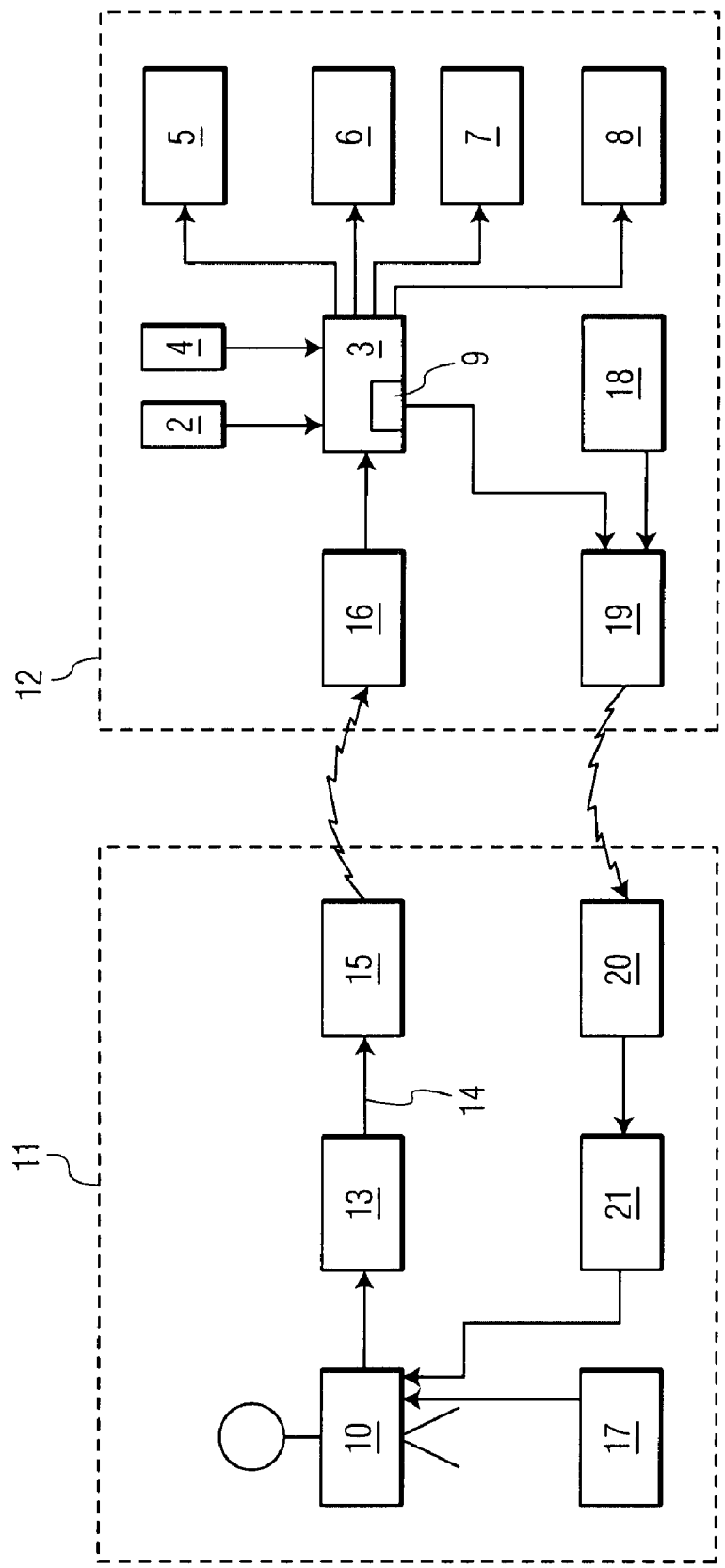
FIG. 1A shows a block diagram of a supervisor-controlled system for landing a plurality of aircraft on which no onboard person controls the aircraft.

FIG. 1A shows a preferred embodiment of the invention for use with an aircraft which contains apparatus which locks onboard personnel out of control because of a hijacking. The lockout may occur when an onboard person becomes aware of the hijacking and activates the lockout system using input device 2. 2 may be a button which is pressed, a keyboard for issuing a command, a speech detecting apparatus which detects critical command words, etc. Other more sophisticated system activating approaches are discussed in U.S. Pat. No. 6,917,863 and are known in the art. The lockout may also occur when an off-aircraft person activates the system (see below).

The lockout command causes logic device 3 to:
a) prevent the onboard pilot from using controls 4 to control critical items such as each of the moveable surfaces 5, throttles 6, landing gear 7 and brakes 8; and
b) issue commands to each of 5, and 6 (and to any other onboard apparatus necessary for control of the aircraft) to fly the aircraft to the vicinity of an airfield at which a landing is desired.

3 contains memory apparatus 9, which includes instructions which allow the aircraft to fly to a desired location in the event of the aforesaid emergency. These instructions may include the coordinates of the target airfield, the coordinates of one or more waypoints, the altitude for each portion of the route, the speed for each portion of the route, the approach vector for the target airfield, information concerning orbiting or loitering in the vicinity of the target airfield, the target runway choice, airfield destination time, the coordinates of one or more secondary/alternative airfield choices and criteria for selecting such alternative choices, and other items as are known in the art. The instructions may be programmed into 9 using conventional programming techniques for a convention re-writable memory. Alternatively, the instructions may be written into a write-once-only memory such as a PROM, an EPROM, and EEPROM and other devices as are known in the art. Alternatively, such instructions may be transmitted to the aircraft—either in part or completely during the flight (via receiver 16).

3 may include at least one autopilot and may include at least one flight management computer. In a "fly-by-wire" aircraft, 3 may be entirely electronic, i.e. contain no moving parts. 3 may be a single electronic device which incorporates the features of autopilot(s) and flight management computer(s) and hijacking management computers and/or circuitry. Alternatively, especially in a non-fly-by-wire vehicle, 3 may contain one or more moving parts which allow for the interruption (likely an irreversible interruption) of one or more mechanical linkages between the onboard pilot controls 4 and the controlled items 5-8.

In the vicinity of the target airfield, the intervention of a human supervisor may be desirable. This would be the case, for example, if multiple aircraft were hijacked and were headed automatically for the same airfield at approximately the same time. It would also be desirable if the target airfield had adverse weather conditions. It would also be desirable if the aircraft was damaged, so that its automated control systems were incapable of adequately controlling it.

FIG. 1A shows the system with which supervisor 10 in a control station 11 controls the landing of an aircraft containing aircraft control apparatus 12. 10 uses input device 13 to send one or more control signals 14 to transmitting device 15. 15 transmits the at least one signal to receiving device 16 aboard the aircraft.

Possible signals 14 (as discussed hereinabove) which could be selected and sent by 10 include (a) a LI signal, (b) a LC signal, (c) a CAVA signal, (d) a CPOA signal, (e) a runway assignment signal, (f) a signal indicating landing time, (g) a signal indicating taxiways, (h) a signal indicating a particular approach vector, (i) a signal indicating a particular parking orbit, and (j) a signal indicating aircraft velocity.

The basis for selecting one or more such signals may be visual sighting of the aircraft, or detection by radar. Information which does not originate on the aircraft which is to land is referred to collectively as 17 in the figure; 17 may also include apparatus for displaying said information. Alternatively, information may originate on the aircraft:

a) In one embodiment, telemetry device 18 may send telemetry information to aircraft transmitter 19; the information is received by control station receiver 20 and displayed for 10 on display device 21. Telemetry information may include (i) the aircraft identification, (ii) the amount of remaining fuel, (iii) aircraft coordinates based on GPS, (iv) aircraft altitude; (v) aircraft velocity; (vi) oil pressure and/or temperature; (vi) information about landing gear position and functioning, and (vii) information about the integrity of various mission critical components and their functioning. The telemetry information may be used to calculate the remaining available fly-time, given the remaining amount of fuel. This information, as well as the other aforementioned telemetered information may be used by 10 to prioritize landing in the event that multiple vehicles are headed for a simultaneous or near simultaneous landing.

b) In another embodiment, landing parameter information stored in 9 (such as preprogrammed runway assignment) may be communicated to 10 by sending signals from 9 to 19 to 20 to 21. Such signals may be sent (a) intermittently, (b) only as the aircraft approaches the airfield, or (c) only by a properly coded and formatted request signal sent by 10 (from 13 to 15 to 16 to 3 to 9).

All signals exchanged would be encrypted, and encoded as per the state of the art. Additional signal security means are discussed in U.S. Pat. No. 6,917,863 including the combination of a high output transmitter 15 and low sensitivity receiver 16, highly directional signal transmission; and frequency hopping and other measures known in the art.

The description of the apparatus shown in FIG. 1A and its operating principles could also pertain to:

(a) an unmanned aerial vehicle (UAV) or unmanned aerial system (UAS) [each, hereinbelow, referred to as "UAV"]; The UAV case is discussed hereinbelow, in conjunction with FIG. 1B; and (b) an aircraft with a human pilot which is not hijacked. One such situation is that of an injured or impaired pilot incapable of flying the aircraft. Another such situation involves an approach to air traffic management in which the onboard pilot voluntarily cedes control of the aircraft when landing; This could be desirable in situations in which there is extreme congestion in the vicinity of the airfield, or in which the vicinity of the airfield contains one or more highly secure/sensitive items. In this case, the pilot would activate the system using 2, analogous to system activation in the event of a hijacking. 2, in this case, would signal 3 to allow landing control by signals 14 received by 16.

11 may be a ground station, an airborne station, a water-based station, a space based station.

Figure 1B:
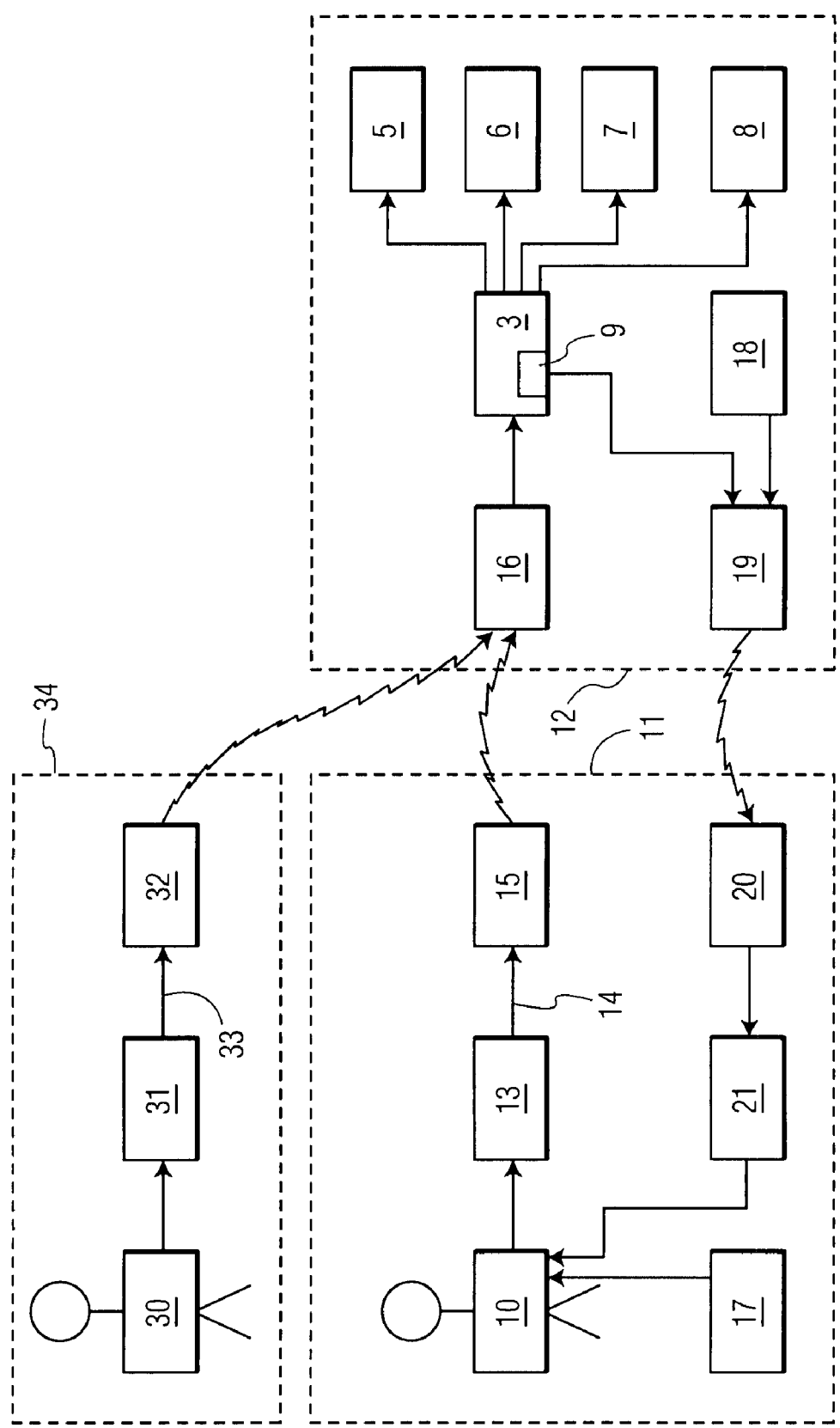
FIG. 1B shows a block diagram of a supervisor-controlled system for landing a plurality of aircraft on which no onboard person controls the aircraft, and in which one or more aircraft may have been controlled by an off-aircraft pilot.

FIG. 1B shows an embodiment of the invention in which the aircraft containing apparatus 12 is piloted and/or controlled by an off-aircraft pilot 30 at one or more times during the course of a flight. One example of such a flight would be that of a UAV. In this case, UAV pilot 30, located at 34, sends UAV control signals 33 to the aircraft along the path 30 to input device 31 to transmitter 32 to aircraft receiver 16. All other elements shown in FIG. 1B have the same function as those elements with identical element numbers shown in FIG. 1A.

The desirability of ceding control of a UAV to a supervisor in the vicinity of an airfield may increase as the number of UAVs increases. Increasing UAV congestion, the lesser extent of UAV pilot training and regulation compared to commercial and passenger pilots, the lesser extent of UAV reliability compared to commercial and passenger air vehicles, the greater susceptibility to weather-induced aerodynamic complexities, and the smaller UAV fuel capacity compared to non-UAV aircraft, are all factors which will make desirable a means of integrated airfield control, when UAV landings are involved. Furthermore, in an airspace or at an airfield where both UAVs and non-UAV (i.e. manned) aircraft fly, the tolerance for anomalous or sub-optimal UAV behavior will be markedly decreased—also thereby increasing the desirability of a system such as that of the invention shown in FIG. 1B.

The UAV pilot would transfer control to 10 by sending a control transfer signal (one type of 33) to 3 via 32 and 16. Such a signal would enable control of the UAV by 10. In an alternate embodiment of the invention, the transfer of control of elements 3, 5, 6, 7 and 8 within apparatus 12 aboard the UAV could be, by statute, mandatory, which allows a properly identified 10 to take control of the UAV in the vicinity of an airfield or other location in which a high degree of safety and security are mandatory.

In one embodiment of the invention for UAV use, 34 may also contain a receiver (not shown) attached to a display device (not shown) for receiving telemetry and other information from 12, transmitted by 19.

FIG. 1B also shows the arrangement in which Remote Initiated Takeover (RITO) occurs, as discussed in U.S. Pat. No. 6,917,863 and U.S. patent application Ser. Nos. 10/919, 169 and 11/388,311. In such a hijacking or emergency situation, an off aircraft supervisor 30 may trigger a takeover, e.g. if he becomes aware of a hijacking or emergency that onboard personnel are not capable of communicating.

Figure 2A:
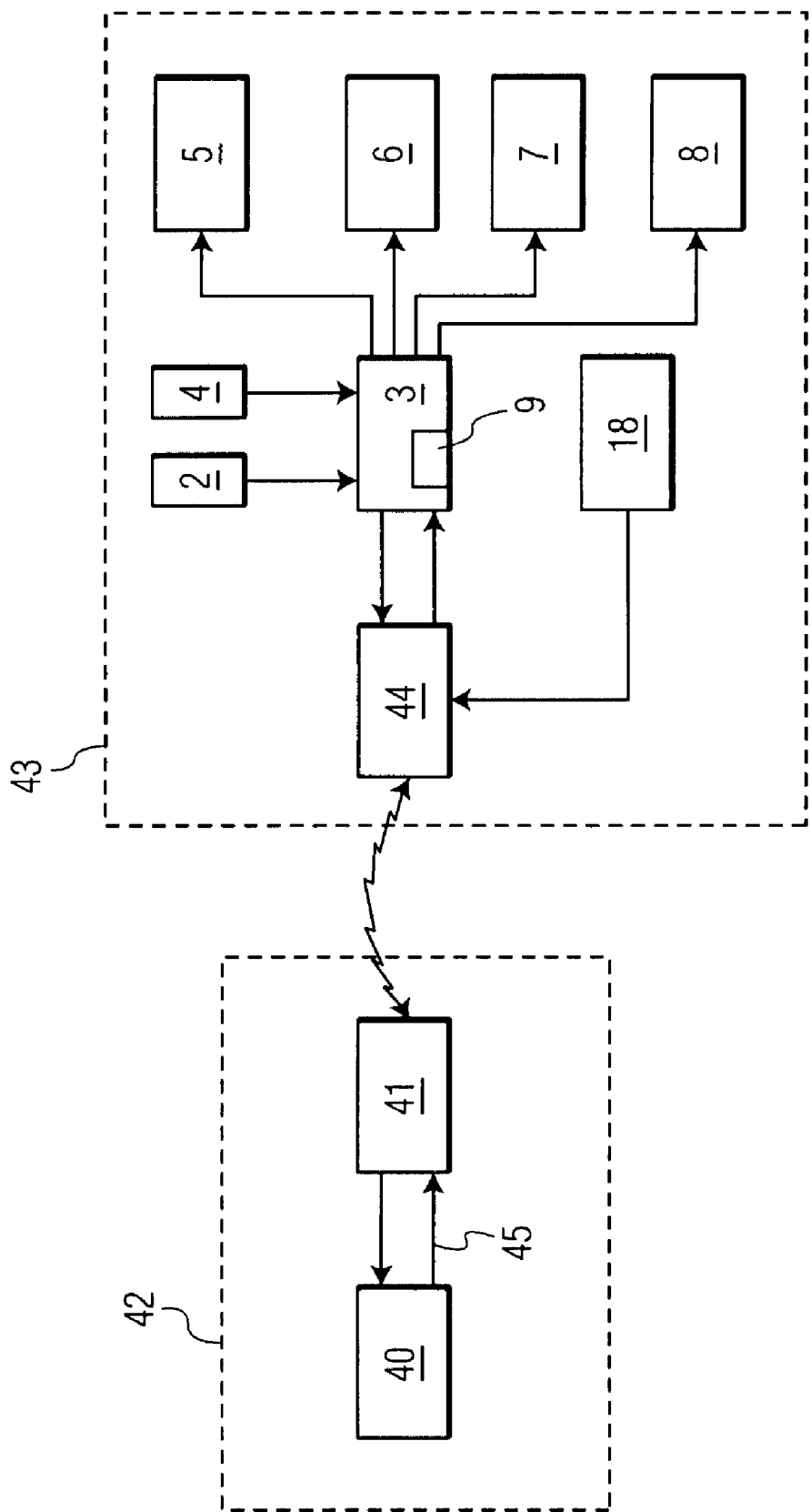
FIG. 2A shows a block diagram of an automatically controlled system for landing a plurality of aircraft on which no onboard person controls the aircraft.
Figure 9:
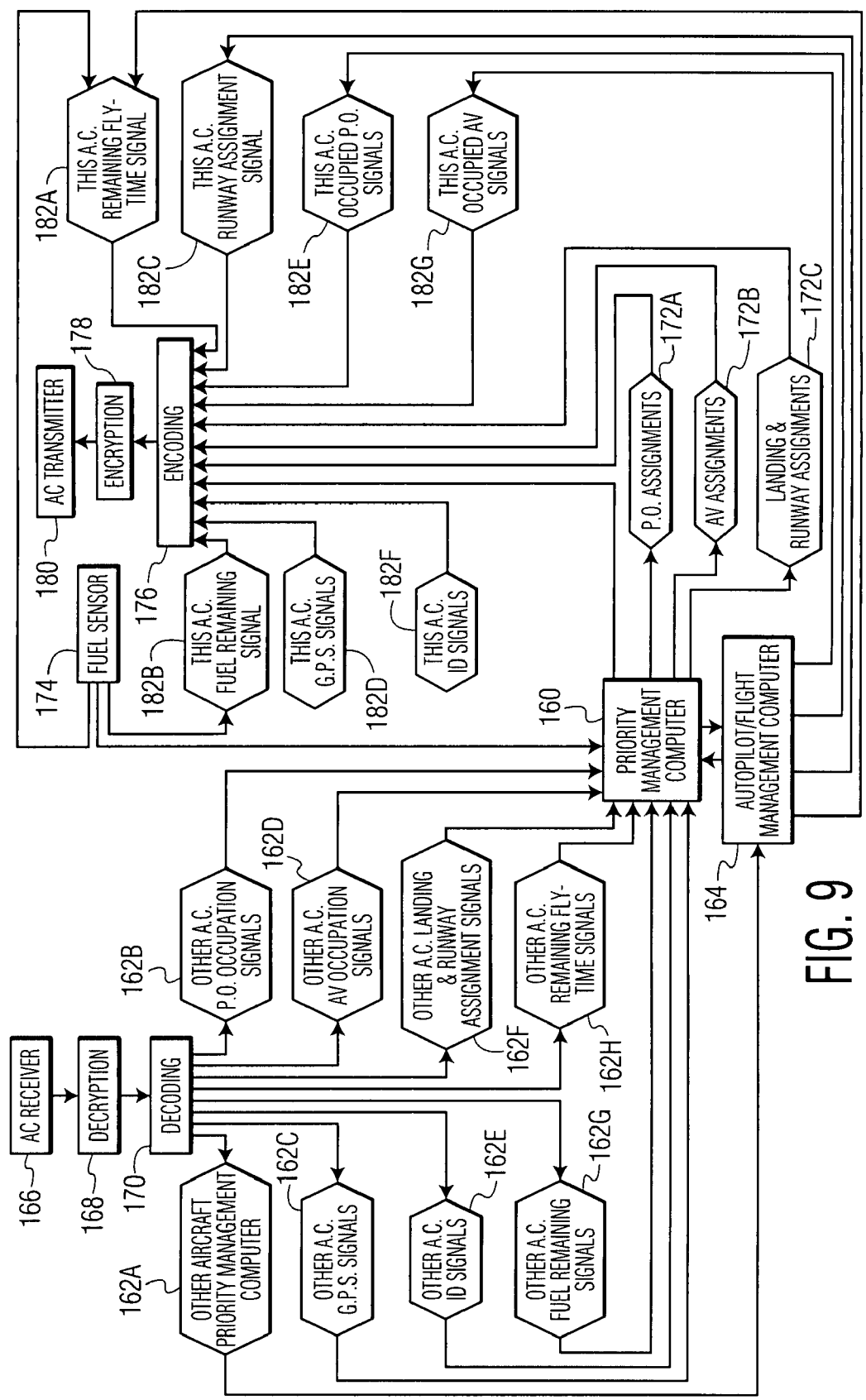
FIG. 9 shows a block diagram of a system which has the capacity to function as both an automated landing system for a particular individual aircraft, and as the controller of a complete automated landing system.

FIG. 2A shows an embodiment of the invention for dealing with hijacked aircraft, aircraft with impaired pilots and UAVs in which the supervisor 30 is replaced by a logic device 40 in control station 42. The logic device performs all of the functions of the supervisor discussed hereinabove. In addition, transmitter 15 and receiver 20 are replaced in FIG. 2A by transmitting/receiving (T/R) device 41, and, transmitter 19 and receiver 16 are replaced in FIG. 2A by transmitting/receiving (T/R) device 44, within aircraft control apparatus 43. Decisions may be made by 40 using algorithms stored therein. Decisions may be based on (a) aircraft identification, communicated by 18 to 44 to 41 to 40; (b) other aircraft telemetry signals as discussed hereinabove, and communicated by the same path as the aircraft ID hereinabove; and (c) previously stored landing parameter information (as discussed hereinabove) along the path 9 (within 3) to 44 to 41 to 40. 40 may be one computer, a group of computers, a part of one computer, or a part of multiple computational devices. 42 may be a ground station, an airborne station, a water-based station, a space based station. In addition, 42 may be located on one or more controlled aircraft, as shown in FIG. 9 hereinbelow. In such a case 41 would link 40 to units 44 (and to the elements coupled to 44) on other aircraft, but 40 would not need an RF link in order to exchange signals with 3 and/or 18 on its particular aircraft—i.e. the on-aircraft connection between 40 and 3, and between 40 and 18 could be hard-wired.

In one embodiment of the invention, a supervisor would over-read the decisions of 40. If desired the supervisor could negate them, or provide alternative decisions. The apparatus for such a hybrid control station would require the hardware that comprises 42, as well as elements 13 and, preferably 21 of element 11 in FIG. 1A. In addition, switching means (not shown in the figure), under control of the supervisor, would be required to assure that—in the case of 30 overruling 40—the signal source was 14 (i.e. supervisor signals) and not 45 (i.e. logic device signals). In yet another embodiment of the invention a hybrid control station with both supervisor 30 and logic device 40 may be configured so that 40 warns 30 in the event of a decision made by 30 which may have adverse or unexpected consequences. In still another embodiment of the invention, 40 may overrule 30, with switching means configured to give control to 40 (over 30), if necessary.

In the case of the hybrid device, the control station may be reduced to a handheld communications device including a suitably modified cellular telephone or Blackberry device or the like.

Figure 2B:
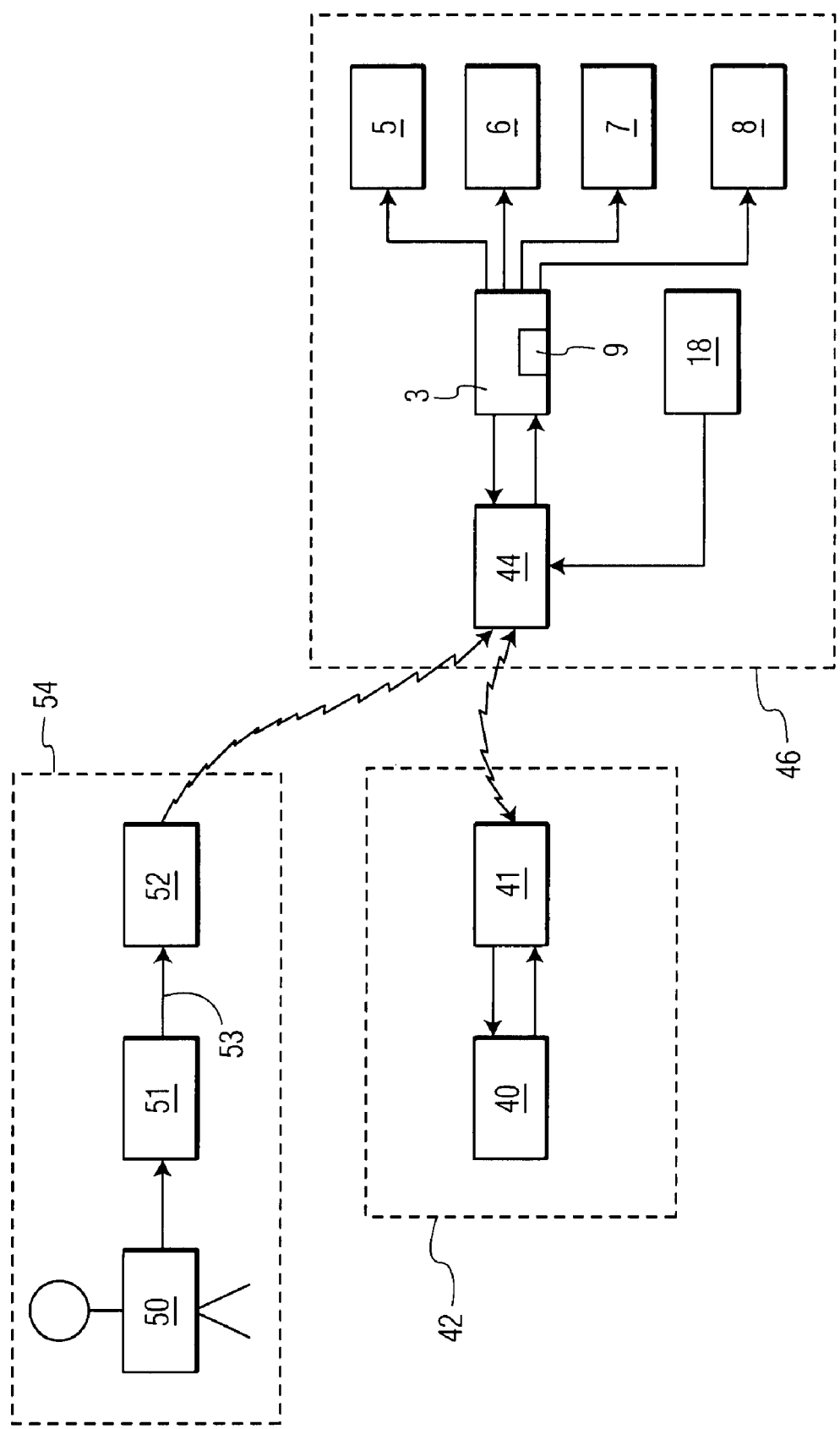
FIG. 2B shows an automatically controlled system for landing a plurality of aircraft on which no onboard person controls the aircraft, and in which one or more aircraft may have been controlled by an off-aircraft pilot.

FIG. 2B shows an embodiment of the invention in which the aircraft containing apparatus 46 is piloted and/or controlled by an off-aircraft pilot 50 at one or more times during the course of a flight. One example of such a flight would be that of a UAV. In this case, UAV pilot 50, located at 54, sends UAV control signals 53 to the aircraft along the path 50 to input device 51 to transmitter 52 to aircraft receiver 16. All other elements shown in FIG. 2B have the same function as their counterparts in FIG. 2A. As was the case with the embodiment described by FIG. 1B, FIG. 2B may also pertain to (a) a RITO situation; and (b) an embodiment in which 54 also includes a receiving device and a display device.

Figure 3A:
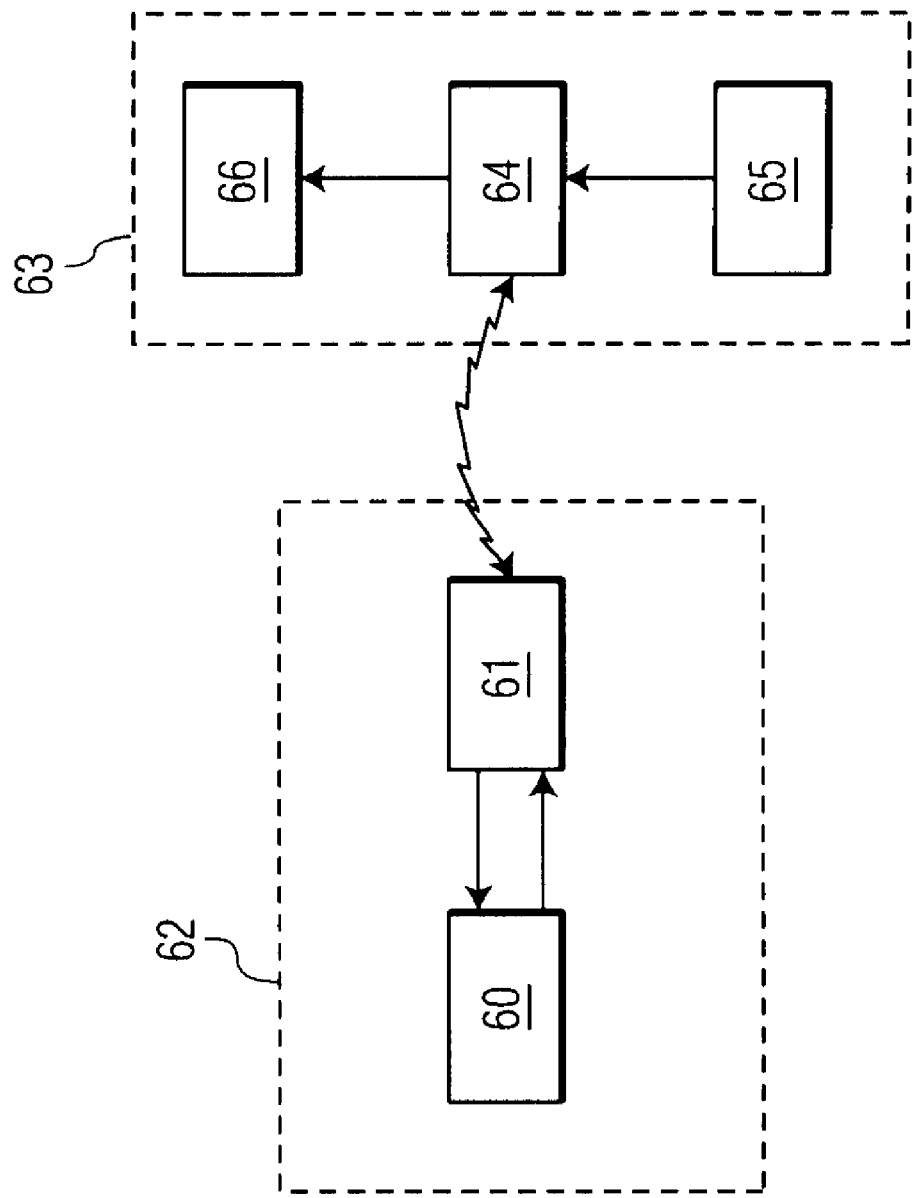
FIG. 3A shows a block diagram of an automatically controlled system for supervising the landing of a plurality of aircraft on which an onboard person controls the aircraft.

FIGS. 3A and 3B pertain to an aircraft with an onboard pilot whose motion in the vicinity of an airfield is to be controlled by a logic device 60. Such motion includes landings, takeoffs and motion within an airport. Such apparatus would be useful: (a) in a small airport which does not have an air traffic controller; (b) in an airport where the number of air traffic controllers at any one time is insufficient to handle the load; (c) as a mobile, freestanding and/or backup device, in the event of damage to some or all of the equipment in an air traffic control center.

FIG. 3A shows an embodiment of the invention in which traffic control instructions outputting from 60 constitute recommendations, which the onboard pilot is advised to carry out. FIG. 3B shows an embodiment of the invention in which the traffic control instructions are carried out automatically.

Referring to FIG. 3A, logic device 60 in control station 62 receives incoming information from aircraft apparatus 63 along the path 65 (aircraft telemetry device) to 64 (aircraft transceiver) to 61 (control station transceiver) to 60. It sends traffic control recommendations to display device 66 aboard the aircraft along the path 60 to 61 to 64 to 66.

Referring to FIG. 3B, there are structural and functional parallels to the apparatus shown in FIG. 2A (with exceptions to be discussed). Control signals sent to aircraft apparatus 73 from control station 62 are along the path 60 to 61 to 67 (aircraft transceiver) to 68 (aircraft logic device) to controlled items 5-8. Aircraft information sent to 60 includes telemetry 70, along the path 70 to 67 to 61 to 60. In an embodiment of the invention in which the landing parameters are stored within 69, they may be sent along the path 68 to 67 to 61 to 60.

In one embodiment of the invention shown in FIG. 3B, the onboard pilot would have no say in the enactment of the air traffic instructions. In another embodiment, the onboard pilot would have to enable remote instruction inputting via input device 71. The onboard pilot could also be given the opportunity to override remote instructions—overriding either a single instruction, multiple instructions or all instructions, using input device 72. 71 and 72 communicate the aforementioned pilot decisions—if such decisions are system options—to logic device 68.

As discussed in conjunction with FIG. 2A, embodiments of the invention in which a hybrid system includes both a supervisor (not shown in the figure) and associated input and display apparatus, and a controller are possible. Embodiments are possible in which: (a) the supervisor may overrule the logic device; (b) the logic device may overrule the supervisor; and (c) the logic device may make recommendations if the supervisor makes recommendations not considered to be sound, based on the logic device algorithms.

Figure 4:
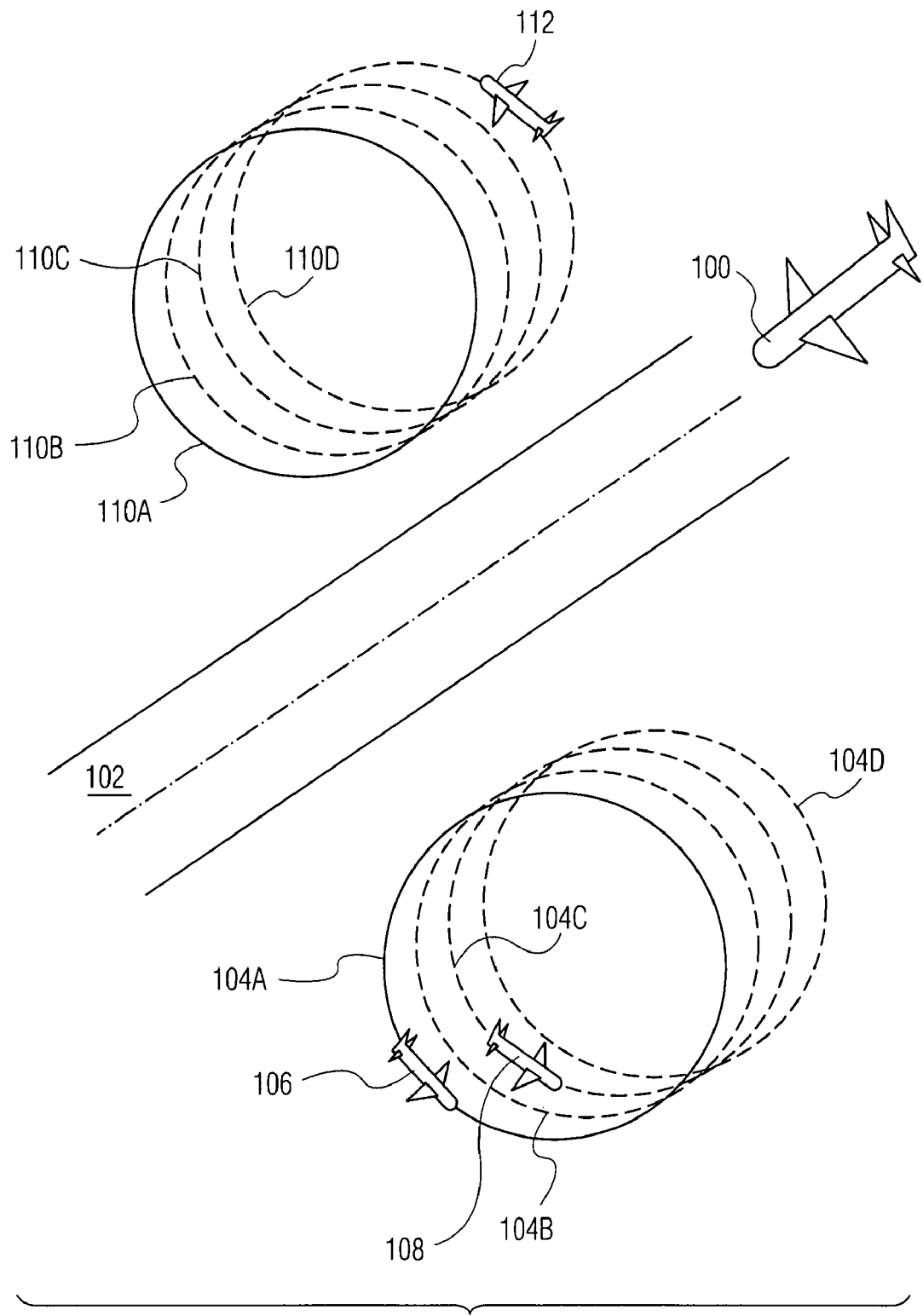
FIG. 4 shows one configuration of parking orbits in the vicinity of a runway.

FIG. 4 shows one possible configuration of parking orbits in relation to a runway. Aircraft 100 is shown in its final approach to runway 102. One stack of four parking orbits 104A-D is shown. Aircraft 106 occupies the highest orbit, 104A. Aircraft 108 occupies the second lowest orbit 104C. A second stack of orbits 110A-D is shown, with aircraft 112 occupying the lowest orbit 110D.

Figure 5A:
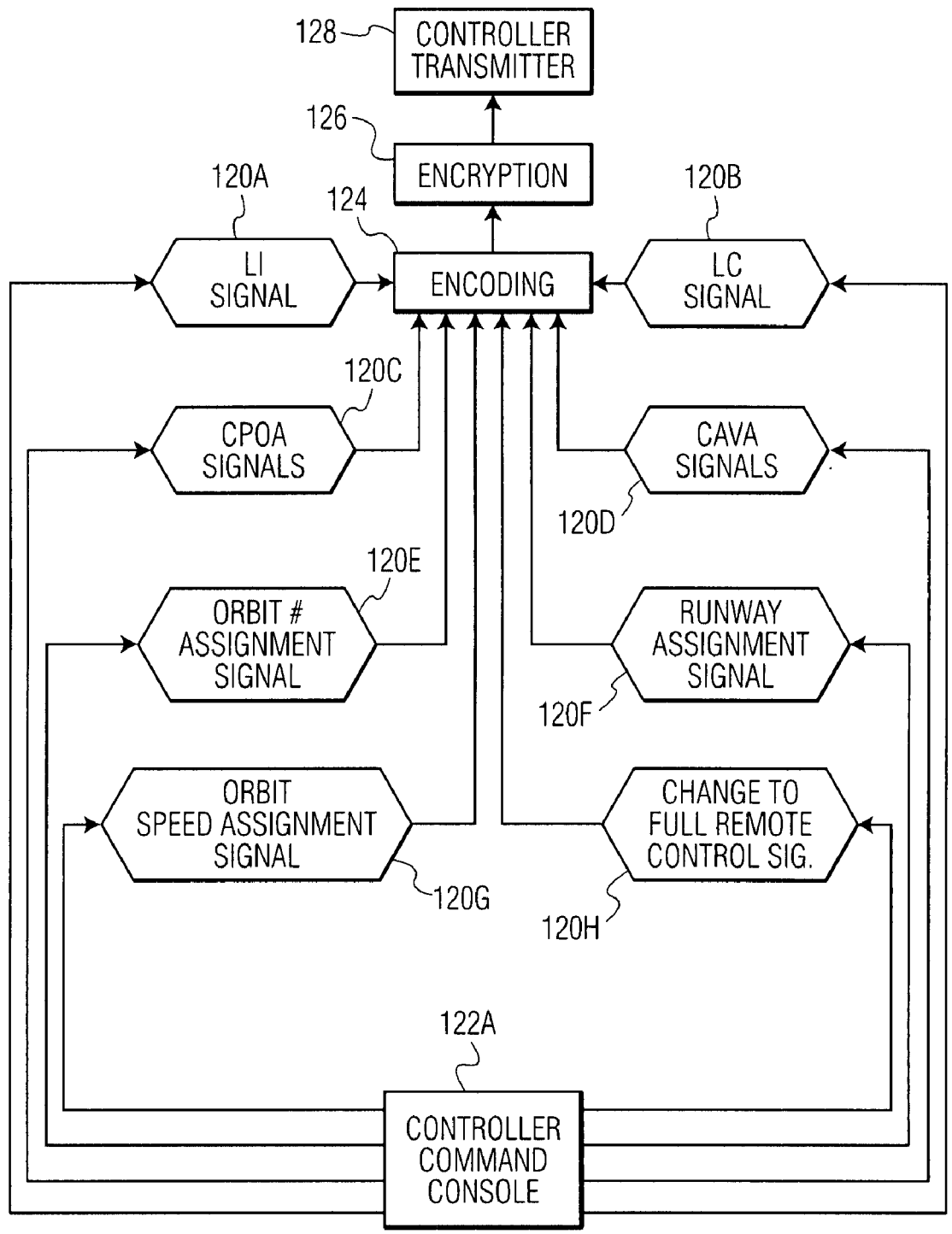
FIG. 5A shows a block diagram of control station transmitting equipment and transmitted signals, for a supervisor-controlled landing management system.

FIG. 5A shows control station equipment for transmitting signals and signals which are sent by a supervisor, intended to control an aircraft. Each of signals 120A-H are possible signals which the supervisor may send to the aircraft. The supervisor would input his actions through console 122A. The signal is encoded at 124, encrypted at 126 and transmitted at 128. Embodiments of the invention which use all, some or only one (e.g. the LC signal) of the signals are possible. Embodiments with additional aircraft control signals are possible. Signal 120H, allows the supervisor to take full control of a hijacked aircraft and remotely fly it as discussed in U.S. Pat. No. 6,917,863.

Figure 5B:
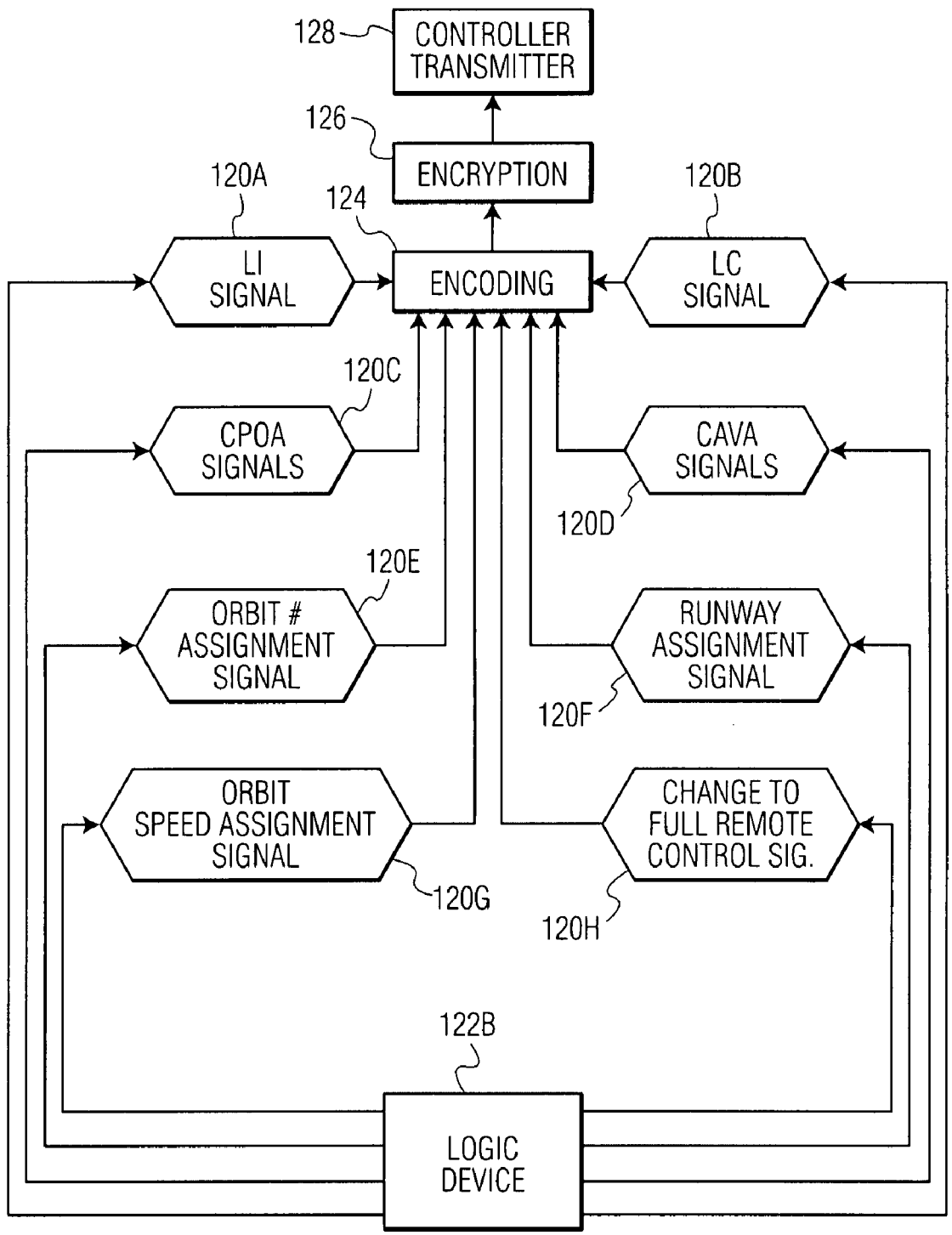
FIG. 5B shows a block diagram of control station transmitting equipment and transmitted signals, for a landing management system controlled by a logic device.

FIG. 5B shows control station equipment for transmitting signals and signals which are sent by logic device 122B (as shown in FIGS. 2A, 2B, 3A and 3B), intended to control an aircraft. Each of signals 120A-H are possible signals which the supervisor may send to the aircraft. Other than the substitution of logic device 122B in FIG. 5B, for supervisor command console 122A of FIG. 5A, the apparatus and its functioning is identical in these two figures.

Figure 6:
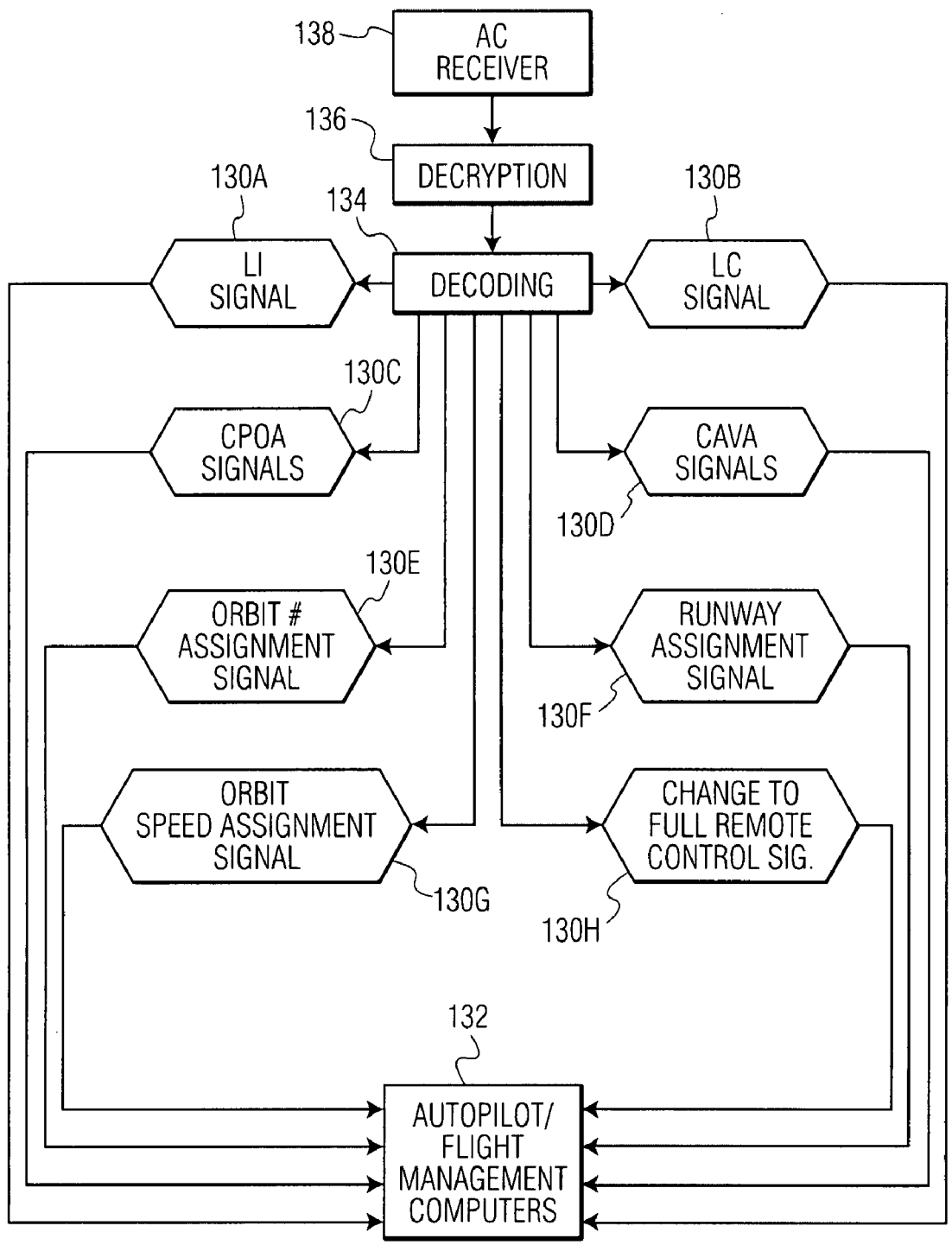
FIG. 6 shows a block diagram of aircraft receiving apparatus and received signals, for one embodiment of the landing management system.

FIG. 6 shows an aircraft receiver and associated components and signals, for receiving the signals sent by the controller transmitter shown in FIGS. 5A and 5B. Each of the possible received signals 130A-H corresponds to the possible controller transmitted signals 120A-H. The signals are received by aircraft receiver 138. They are decrypted at 136, and decoded at 134. Each of 130A-H is sent to the autopilot/flight management computer/logic device system aboard the aircraft. Embodiments with all, some or only one received signal are possible.

Figure 7:
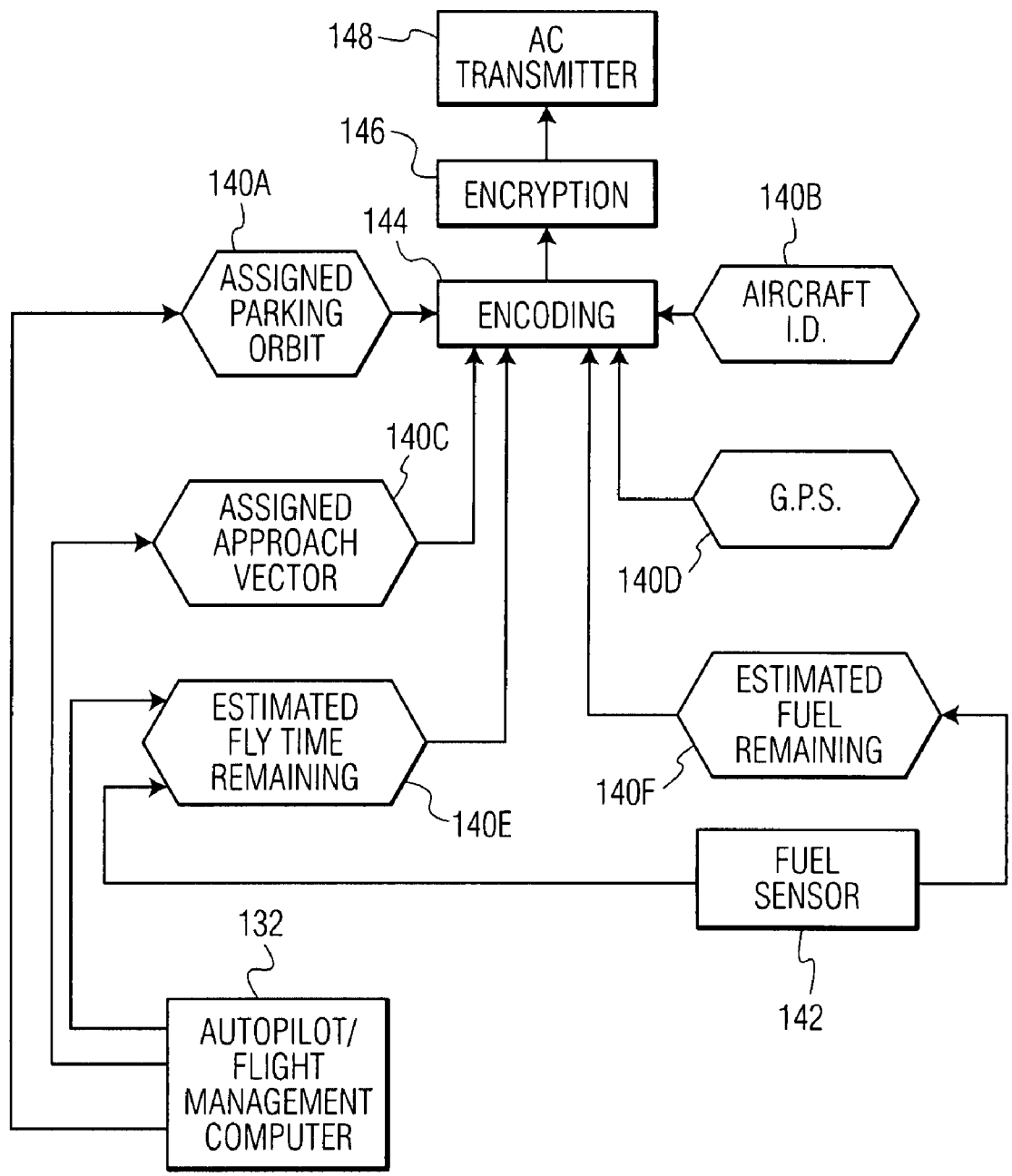
FIG. 7 shows a block diagram of aircraft transmitting apparatus and transmitted signals, for one embodiment of the landing management system

FIG. 7 shows the aircraft transmitter and associated components and signals. Each of the possible transmitted signals 140A-H corresponds to the aircraft information of use to the control station supervisor (or control station logic device). Information from fuel sensor 142 may be transmitted, and may be used along with flight management computer information to compute the estimated amount of remaining fly time for the current fuel supply. The signals are encoded 144, encrypted 146 and transmitted 148. Embodiments with all, some, one or no transmitted aircraft signals are possible.

Figure 8A:
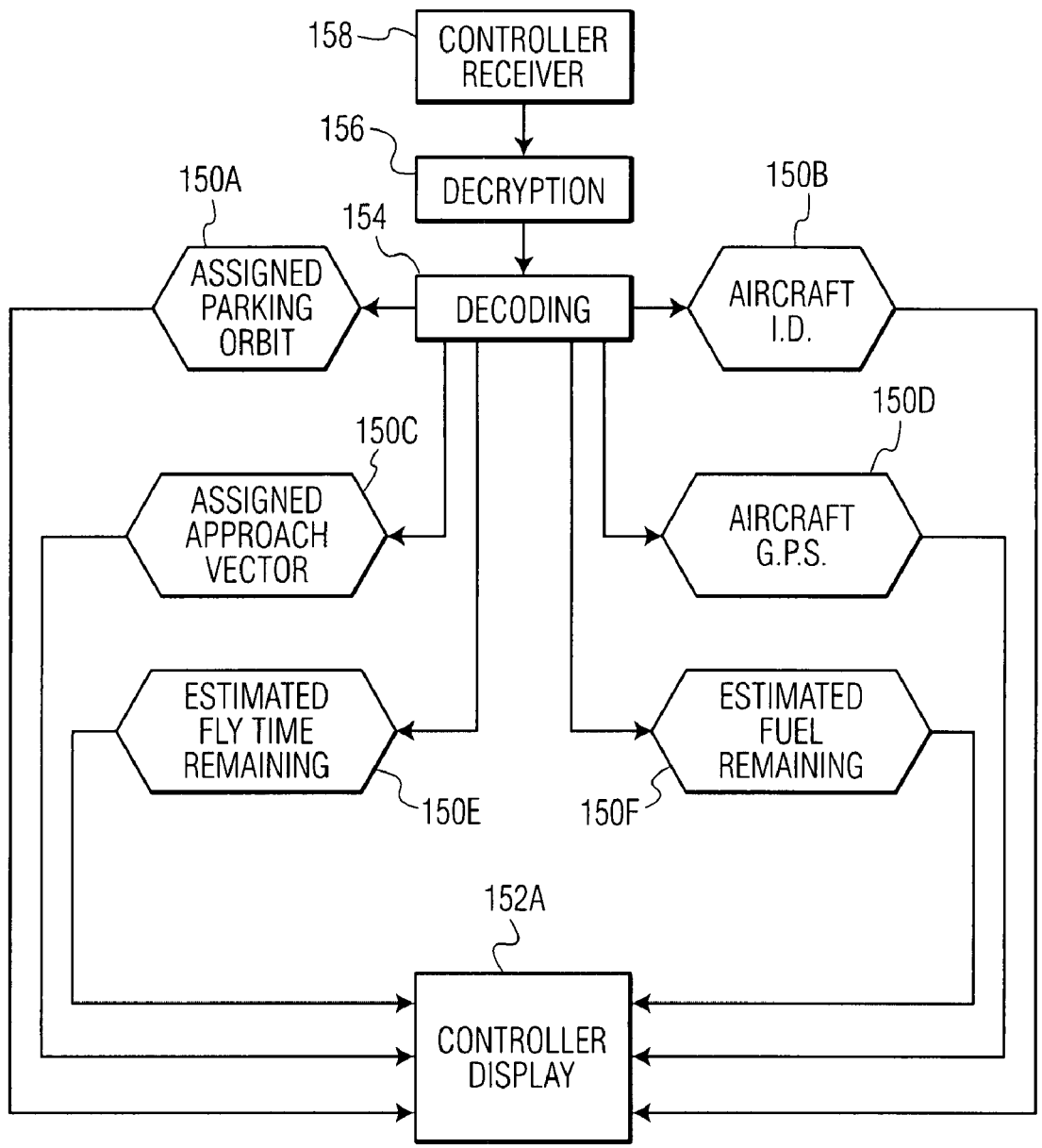
FIG. 8A shows a block diagram of control station receiving equipment and received signals, for a supervisor-controlled landing management system.

FIG. 8A shows the control station receiver and associated components and signals. Each of the possible received signals 150A-F corresponds to the signals sent by the aircraft. The signals are received 158, decrypted 156, decoded 154 and displayed to a supervisor at 152A. Embodiments with all, some, one or no received aircraft signals are possible.

Figure 8B:
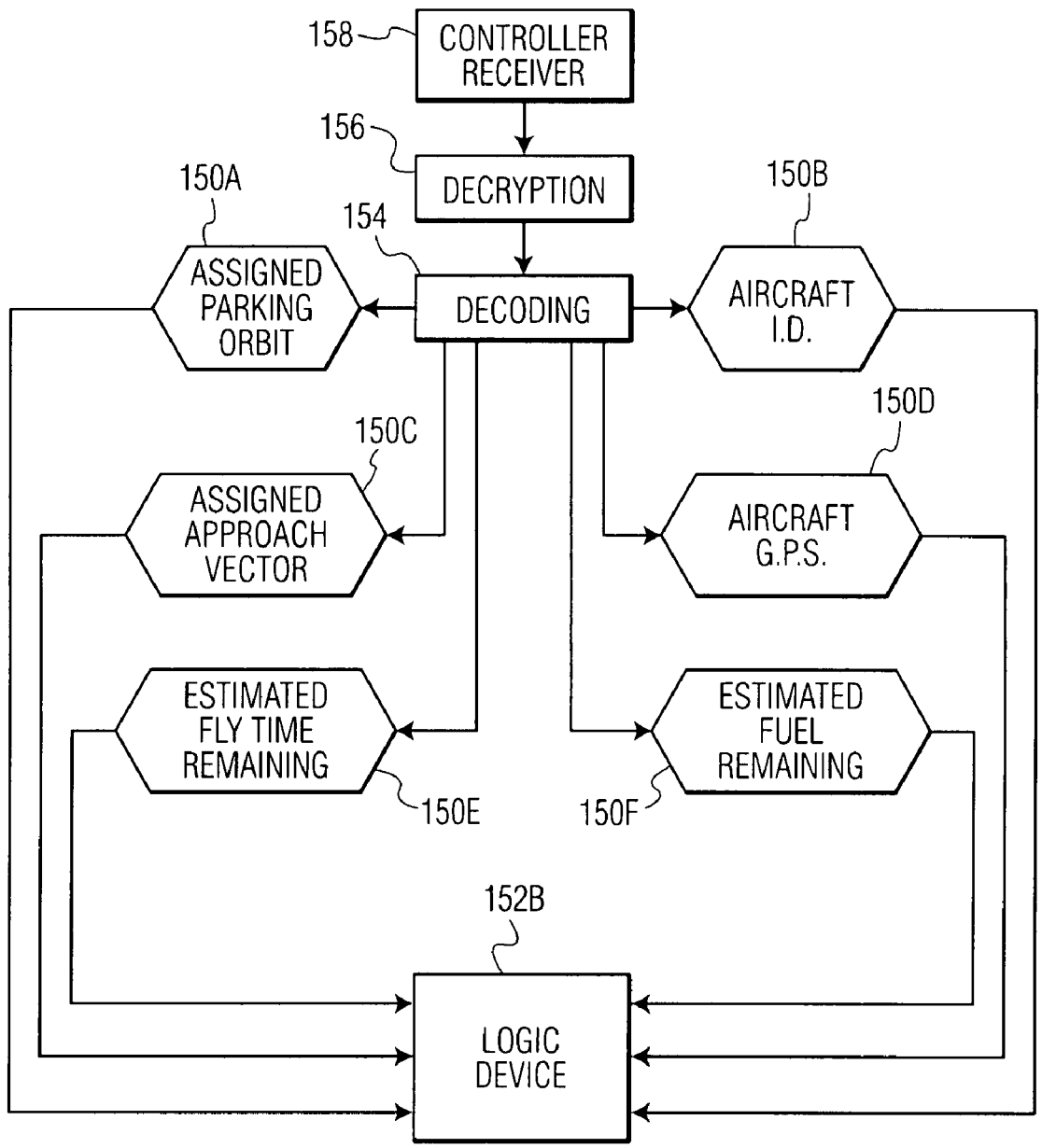
FIG. 8B shows a block diagram of control station receiving equipment and received signals, for a landing management system controlled by a logic device.

FIG. 8B shows control station equipment for receiving signals and signals which are sent to logic device 152B (as shown in FIGS. 2A, 2B, 3A and 3B), instead of being sent to supervisor display 152A. Each of signals 150A-F are possible signals which the logic device may use for generating aircraft instructions. Other than the substitution of logic device 152B in FIG. 8B, for supervisor command console 152A of FIG. 8A, the apparatus and its functioning is identical in these two figures.

FIG. 9 shows a system that allows self-management of multiple aircraft without a separately located control station. The control station is replaced by priority management computer 160. Embodiments of the invention with priority management systems aboard all aircraft or aboard some aircraft are possible. When multiple aircraft each have a priority management computer, the computers may exchange information to select a single computer which remains the dominant computer for as long as a) it is in the airspace near the runway, or b) it is in the vicinity. The dominant computer may be selected based on a) least recent arrival time, b) most recent arrival time, c) other values of arrival time, d) a preset numbering system, such that the computer numbered with the highest number becomes the dominant one, e) combinations of the above, or f) other approaches.

The priority management computer (PMC) receives one or more of signals 162B-H which indicate conditions, previously programmed assignments or other information from each of the aircraft waiting to land. In addition, if a PMC on another aircraft is the dominant one, signals from the PMC 162A are received and sent to autopilot/flight management computers 164. Embodiments with fewer or greater numbers of received signals are possible.

Each of signals 162A-H is received by receiver 166, decrypted 168 and decoded 170.

PMC 160 using information from other aircraft (signals 162B-H, and information from the aircraft in which it is located (from autopilot/flight management computer 164 and from fuel sensor 174) generates a priority list/order for landing (172C), runway assignments 172C, PO assignments 172A, and AV assignments 172B. In cases where these items were previously assigned (either by pre-programmed information, or by earlier PMC assignments), the assignments may be changed or updated. The assignments are encoded 176, encrypted 178 and transmitted 180.

In the case where the dominant PMC is aboard another aircraft, signals 182A-G, indicating information pertaining to the aircraft without the dominant PMC are transmitted via 176, 178 and 180.

The priority management computer and associated system shown in FIG. 9 can be used:
  a) in a non-hijacking situation:
    i) for managing the landings and approach to landing fields for unmanned aerial vehicles or unmanned aerial systems;
    ii) for managing airfields in which there is no air traffic controller (ATC);
    iii) for managing airfields in which there is an ATC, as a backup system for the ATC (or in which the ATC serves as the backup for the invention shown in FIG. 9); and
    iv) for managing aircraft in which an impaired pilot or pilots cannot safely fly their aircraft; and
    v) combinations of i), ii), iii) and iv) hereinabove; and
  b) in a hijacking situation:
    i) in which multiple aircraft are hijacked and are headed for the same airfield; and
    ii) for managing airfields in which there are both hijacked aircraft and non-hijacked aircraft needing to land.

There has thus been shown and described a novel apparatus for airfield management which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A system for supervising the landing of a plurality of aircraft at a given airfield by a human supervisor in a control station, each of said aircraft being capable of landing without control by any human personnel on board, said system comprising, in combination:
  (a) a control station comprising:
    (1) at least one input device, responsive to said supervisor, for producing at least one air traffic control signal for controlling the order of landing of said plurality of aircraft; and
    (2) a transmitting device, coupled to said at least one input device, for electronic communication with each of a plurality of aircraft; and
  (b) aircraft control apparatus disposed on each of a plurality of aircraft, each said apparatus including:
    (1) a receiving device for electronic communication with said transmitting device of said control station;
    (2) at least one logic device, coupled to said receiving device, for controlling said aircraft by controlling at least one of the movable aerodynamic control surfaces of the aircraft, throttles, landing gear, and brakes, said logic device being programmed to pilot said aircraft to the vicinity of said airfield and thereafter to automatically land said aircraft at said airfield;
  wherein (1) said at least one control signal is selected by means of said input device by said supervisor, based on said supervisor's observations of said plurality of aircraft; (2) said control signal is transmitted from said control station to the respective logic device on at least one of said plurality of aircraft; and (3) in response thereto, said logic device controls the respective aircraft, thereby to control its flight in the vicinity of an airfield.

2. The system defined in claim 1, wherein said logic device includes at least one of:
  a) an autopilot aboard said aircraft;
  b) a flight management computer aboard said aircraft.

3. The system defined in claim 1, wherein one of said at least one logic device is further operative to prevent control of the aircraft by any person onboard the aircraft in the event of a hijacking.

4. The system defined in claim 1, wherein at least one of said aircraft is unmanned.

5. The system defined in claim 1, further comprising:
  a) at least one telemetry device aboard the aircraft, for producing a telemetry output;
  b) a transmitter aboard the aircraft, coupled to the at least one telemetry device, for transmitting the telemetry output;
  c) a receiver at the control station for receiving the telemetry output; and
  d) a display device at the control station, coupled to the receiver, for displaying the telemetry output.

6. The system defined in claim 5, wherein said telemetry device includes at least one of:
  i) an aircraft identification generating device;
  ii) a fuel-remaining sensor; and
  iii) a GPS;
wherein said telemetry output may be used for at least one of: aircraft identification, and the calculation of remaining fuel safety margin for said aircraft.

7. The system defined in claim 1, wherein said control signal is a landing inhibit command, whereby said command causes said logic device to postpone the landing of said aircraft.

8. The system defined in claim 7, where said postponement causes said aircraft to move in a pre-defined orbit in the vicinity of the airfield.

9. The system defined in claim 7, where said postponement causes said aircraft to move in one of a plurality of pre-defined orbits in the vicinity of the airfield, said orbit selected by said supervisor.

10. The system defined in claim 9, wherein said control signal represents a command which changes the aircraft motion from one predefined orbit to another.

11. The system defined in claim 1, wherein said control signal represents a command which causes said aircraft to approach the airfield along one of a plurality of pre-defined approach vectors.

12. The system defined in claim 1, wherein said control signal represents a command which causes said aircraft to land on one of a plurality of runways.

13. The system defined in claim 1, wherein said control signal represents a command which causes said aircraft to land at a particular time.

14. The system defined in claim 1, wherein said control signal represents a landing confirmation command which causes said logic device to enable landing instructions previously inputted to at least one said logic device, thereby to cause the landing of said aircraft.

15. The system defined in claim 1, further comprising:
  a) at least one landing parameter logic device aboard the aircraft, for storing landing parameter information;
  b) a transmitter aboard the aircraft, coupled to said at least one landing parameter logic device, for transmitting said landing parameter information;
  c) a receiver at the control station for receiving said landing parameter information; and d) a display device at the control station, coupled to the receiver, for displaying at least some of said landing parameter information.

16. The system defined in claim 15, wherein said control signal represents a landing inhibit command which causes said logic device to postpone the landing of said aircraft.

17. The system defined in claim 15, wherein said landing parameter information includes at least one of:
   (1) airport identity;
   (2) airport location;
   (3) airport approach vector;
   (4) airport runway assignment; and
   (5) airport holding orbit.

18. The system defined in claim 15, wherein said control signal represents a command which causes said aircraft to change its approach to the airfield from a pre-assigned approach vector to one of a plurality of possible alternate approach vectors.

19. The system defined in claim 15, wherein said control signal represents a command which causes said aircraft to change its runway choice from a pre-assigned runway to one of a plurality of possible alternate runways.

20. The system defined in claim 15, wherein said control signal represents a command which causes said aircraft to change its landing time to another landing time.

21. The system defined in claim 15, wherein said control signal represents a landing confirmation command, whereby said command causes said logic device to initiate the landing of said aircraft.

22. The system defined in claim 1, wherein said control signal represents a command which causes said aircraft to traverse a particular taxiway on the ground.

23. The system defined in claim 1, wherein the landing of at least one of said aircraft is controllable by at least one alternate pilot, said alternate pilot selected from the group consisting of (i) at least one autopilot; (ii) at least one flight management computer, and (iii) a human pilot remote from said aircraft.

24. The system defined in claim 23, further comprising a remote pilot transmitting device, whereby said remote pilot may communicate with said logic device for control of said aircraft.

25. The system defined in claim 23, wherein each of said at least one autopilot and said at least one flight management computer is coupled to a respective one of said at least one logic device.

26. The system defined in claim 23, wherein said logic device is operative to receive signals from said supervisor to override the control signals of said alternate pilot.

27. A system for supervising the landing of a plurality of aircraft at a given airfield by a control device in a control station, each of said aircraft being capable of landing without control by any human personnel on board, said system comprising, in combination:
   (a) a control station comprising:
      (1) a first transmitting/receiving (T/R) device for electronic communication with each of a plurality of aircraft; and
      (2) at least one first logic device, coupled to said first T/R device, for analysis of received aircraft information, for the computation of prioritizing information for aircraft landing, and for the generation of landing commands based on said prioritizing information; and
   (b) aircraft control apparatus disposed on each of a plurality of aircraft, each said apparatus including:
      (1) a second T/R device for electronic communication with said first T/R device of said control station;
      (2) at least one second logic device, coupled to the second T/R device, for controlling the landing of said aircraft by controlling at least one of the movable aerodynamic surfaces of the aircraft, throttles, landing gear and brakes, said logic device being programmed to pilot said aircraft to the vicinity of said airfield and thereafter to automatically land said aircraft at said airfield; and
      (3) at least one telemetry device, coupled to the second T/R device, for obtaining information about said aircraft required for landing prioritization;
   wherein (1) said telemetry information is transmitted from a plurality of aircraft needing to land; (2) information is received at said control station and processed by said at least one first logic device; (3) said at least one first logic device generates a landing sequence for said plurality of aircraft based on said information; (4) based on said landing sequence, said at least one first logic device generates landing commands for each of said aircraft; and (5) said landing commands are transmitted from said first T/R device to said second T/R device on at least one of said aircraft; (6) in response thereto, said respective at least one second logic device controls the respective aircraft,
      thereby to control the landing sequence in the vicinity of an airfield.

28. The system defined in claim 27, wherein said second logic device includes at least one of:
   a) an autopilot aboard said aircraft;
   b) a flight management computer aboard said aircraft.

29. The system defined in claim 27, wherein said second logic device is further operative to prevent control of the aircraft by any person onboard the aircraft in the event of a hijacking.

30. The system defined in claim 27, wherein at least one of said aircraft is unmanned.

31. The system defined in claim 27, wherein said telemetry device includes at least one of:
   i) an aircraft identification generating device;
   ii) a fuel-remaining sensor; and
   iii) a GPS;
wherein said telemetry output may be used for at least one of: aircraft identification and the calculation of remaining fuel safety margin for said aircraft.

32. The system defined in claim 27, wherein at least one of said landing commands is a landing inhibit command, whereby said command causes said second logic device to postpone the landing of said aircraft.

33. The system defined in claim 32, where said postponement causes said aircraft to move in a pre-defined orbit in the vicinity of the airfield.

34. The system defined in claim 32, where said postponement causes said aircraft to move in one of a plurality of pre-defined orbits in the vicinity of the airfield, said orbit selected by said first logic device.

35. The system defined in claim 34, wherein said first logic device may send a command which changes the aircraft motion from one predefined orbit to another.

36. The system defined in claim 27, wherein said first logic device may send a command which causes said aircraft to approach the airfield along one of a plurality of pre-defined approach vectors.

37. The system defined in claim 27, wherein at least one of said landing commands causes said aircraft to land on one of a plurality of runways.

38. The system defined in claim 27, wherein at least one of said landing commands causes said aircraft to land at a particular time.

39. The system defined in claim 27, wherein at least one of said landing commands is a landing confirmation command, whereby said command causes said second logic device to initiate the landing of said aircraft.

40. The system defined in claim 27, further comprising at least one landing parameter logic device aboard the aircraft, for storing landing parameter information.

41. The system defined in claim 40, wherein at least one of said landing commands is a landing inhibit command which causes said second logic device to postpone the landing of said aircraft.

42. The system defined in claim 40, wherein said landing parameter information includes at least one of:
   (1) airport identity;
   (2) airport location;
   (3) airport approach vector;
   (4) airport runway assignment; and
   (5) airport holding orbit.

43. The system defined in claim 40, wherein at least one of said landing commands causes said aircraft to change its approach to the airfield from a pre-assigned approach vector to one of a plurality of possible alternate approach vectors.

44. The system defined in claim 40, wherein at least one of said landing commands causes said aircraft to change its runway choice from a pre-assigned runway to one of a plurality of possible alternate runways.

45. The system defined in claim 40, wherein at least one of said landing commands causes said aircraft to change its landing time to another landing time.

46. The system defined in claim 40, wherein at least one of said landing commands represents a landing confirmation command, whereby said command causes said second logic device to initiate the landing of said aircraft.

47. The system defined in claim 27, wherein at least one of said landing commands causes said aircraft to traverse a particular taxiway on the ground.

48. The system defined in claim 27, wherein the landing of at least one of said aircraft is controllable by at least one alternate pilot, said alternate pilot selected from the group consisting of (i) at least one autopilot; (ii) at least one flight management computer, and (iii) a human pilot remote from said aircraft.

49. The system defined in claim 48, further comprising a remote pilot transmitting device, whereby said remote pilot may communicate with said second logic device for control of said aircraft.

50. The system defined in claim 48, wherein each of said at least one autopilot and said at least one flight management computer is coupled to a respective one of said at least one second logic device.

51. The system defined in claim 48, wherein said second logic device is operative to receive signals from said at least one first logic device to override the control signals of said alternate pilot.

52. The system defined in claim 27, wherein said control station (a) is onboard one of said aircraft.

53. A system for supervising the movement of a plurality of aircraft in the vicinity of an airfield by a control device in a control station, each of said aircraft capable of being controlled by an onboard pilot, said system comprising, in combination:

(a) a control station comprising:
   (1) a first transmitting/receiving (T/R) device for electronic communication with each of a plurality of aircraft; and
   (2) at least one first logic device, coupled to said first T/R device, for analysis of received aircraft information and for the computation of traffic control instructions for orderly aircraft movement in the vicinity of said airfield; and
(b) aircraft control apparatus disposed on each of a plurality of aircraft, each said apparatus including:
   (1) a second T/R device for electronic communication with said first T/R device of said control station;
   (2) a display device coupled to said second T/R device, aboard each aircraft for displaying said traffic control instructions; and
   (3) at least one telemetry device, coupled to the second T/R device, for providing aircraft information about said aircraft required for aircraft supervision in the vicinity of said airfield;
wherein (1) said aircraft information is transmitted from each of a plurality of aircraft in the vicinity of said airfield; (2) aircraft information is received at said control station and processed by said at least one first logic device; (3) said at least one first logic device generates traffic control instructions for each of said plurality of aircraft based on said information; (4) said traffic control instructions are transmitted from said first T/R device to said respective second T/R devices on said aircraft; and (5) said traffic control instructions are displayed on said aircraft;
thereby to allow for orderly motion of aircraft in the vicinity of an airfield without a human air traffic controller.

54. The system defined in claim 53, wherein said traffic control instructions supervise at least one of:
   (i) aircraft landing; and
   (ii) aircraft takeoff.

55. The system defined in claim 54, wherein at least one of said first logic device generates landing sequence instructions indicating the landing sequence for aircraft needing to land at said airfield at the time of said landing sequence generation.

56. The system defined in claim 54, wherein said traffic control instructions include a landing inhibit instruction, instructing said onboard pilot to postpone the landing of said aircraft.

57. The system defined in claim 56, where said landing inhibit instruction instructs said onboard pilot to move said aircraft into a pre-defined orbit in the vicinity of the airfield.

58. The system defined in claim 56, where said landing inhibit instruction instructs said onboard pilot to move said aircraft into one of a plurality of pre-defined orbits in the vicinity of the airfield, said orbit selected by said first logic device.

59. The system defined in claim 58, wherein said first logic device may send traffic control instructions, instructing said onboard pilot to change the aircraft motion from one pre-defined orbit to another.

60. The system defined in claim 54, wherein said first logic device may send an instruction, instructing said aircraft to approach the airfield along one of a plurality of pre-defined approach vectors.

61. The system defined in claim 54, wherein said traffic control instructions is a landing confirmation instruction, instructing said onboard pilot to initiate the landing of said aircraft.

62. The system defined in claim 53, wherein said first logic device generates traffic control instructions indicating at least one of:

(i) landing instructions including at least one of:
   (α) the approach vector for an aircraft approaching said airfield;
   (β) the choice of runway for an aircraft which is going to land at said airfield;
   (γ) instructions describing an air path to be taken by an aircraft in the vicinity of said airfield, in order to delay a landing; and
   (δ) the time that an aircraft should land;
(ii) motion instructions for aircraft on the ground at said airfield; and
(iii) takeoff instructions including at least one of:
   (α) the takeoff runway from which an aircraft should take off;
   (β) the taxiways that an aircraft should traverse to reach said takeoff runway;
   (γ) any time and place where a temporary halt in aircraft motion is necessary; and
   (δ) the time that an aircraft should take off.

63. The system defined in claim 62, wherein said air path is defined by at least one of:
the altitude, the radius and the spatial coordinates of the center of a circular orbit;
the altitude, the ellipticity, and the spatial coordinates of each of the foci of an elliptical orbit; and
the coordinates of each of a sufficiently large number of points along said air path to define said air path.

64. The system defined in claim 53, wherein said aircraft control apparatus further comprises at least one second logic device, coupled to said second T/R device, for controlling said aircraft by controlling at least one of the movable aerodynamic control surfaces of the aircraft, throttles, landing gear, and brakes;
whereby said second logic device automatically carries out said air traffic instructions;
thereby to allow said first logic device to control the motion of said aircraft in the vicinity of said airfield.

65. The system defined in claim 64, wherein said aircraft control apparatus further comprises an instruction enabling input device, coupled to said second logic device, to allow said second logic device to enact said air traffic instructions transmitted from said first logic device;
thereby to allow said onboard pilot to enable control of said aircraft by said first logic device, in the vicinity of said airfield.

66. The system defined in claim 64, wherein said aircraft control apparatus further comprises an override input device, coupled to said second logic device, to allow said onboard pilot to input an override command, thereby to allow said onboard pilot to override the air traffic instructions transmitted from said first logic device.

67. The system defined in claim 66, wherein said override input device is further coupled to said second T/R device, thereby to transmit said override input information to said first logic device.

68. The system defined in claim 64, wherein said traffic control instructions control at least one of:
(i) aircraft landing; and
(ii) aircraft takeoff.

69. The system defined in claim 68, wherein said first logic device generates landing sequence instructions, for transmission to said second logic devices;
thereby controlling the landing sequence for aircraft needing to land at said airfield at the time of said landing sequence generation.

70. The system defined in claim 64, wherein said first logic device generates traffic control instructions indicating at least one of:
(i) landing instructions including at least one of:
   (α) the approach vector for an aircraft approaching said airfield;
   (β) the choice of runway for an aircraft which is going to land at said airfield;
   (γ) instructions describing an air path to be taken by an aircraft in the vicinity of said airfield, in order to delay a landing; and
   (δ) the time that an aircraft should land;
(ii) motion instructions for aircraft on the ground at said airfield; and
(iii) takeoff instructions including at least one of:
   (α) the takeoff runway from which an aircraft should take off;
   (β) the taxiways that an aircraft should traverse to reach said takeoff runway;
   (γ) any time and place where a temporary halt in aircraft motion is necessary; and
   (δ) the time that an aircraft should take off.

71. The system defined in claim 70, wherein said air path is defined by at least one of:
the altitude, the radius and the spatial coordinates of the center of a circular orbit;
the altitude, the ellipticity, and the spatial coordinates of each of the foci of an elliptical orbit; and
the coordinates of each of a sufficiently large number of points along said air path to define said air path.

72. The system defined in claim 64, wherein said traffic control instructions is a landing inhibit instruction, causing said second logic device to postpone the landing of said aircraft.

73. The system defined in claim 72, where said landing inhibit instruction causes said second logic device to move said aircraft into a pre-defined orbit in the vicinity of the airfield.

74. The system defined in claim 72, where said landing inhibit instruction causes said second logic device to move said aircraft into one of a plurality of pre-defined orbits in the vicinity of the airfield, said orbit selected by said first logic device.

75. The system defined in claim 74, wherein said first logic device may send traffic control instructions, causing said second logic device to change the aircraft motion from one pre-defined orbit to another.

76. The system defined in claim 64, wherein said first logic device may send an instruction, causing said second logic device to cause said aircraft to approach the airfield along one of a plurality of pre-defined approach vectors.

77. The system defined in claim 64, wherein said traffic control instructions is a landing confirmation instruction, causing said second logic device to cause the landing of said aircraft.

78. The system defined in claim 53, wherein said telemetry device comprises at least one of:
(i) an aircraft identification generating device;
(ii) a fuel remaining sensor; and
(iii) a global positioning apparatus;
wherein said telemetry output is transmitted to said first logic device for at least one of: aircraft identification, and the calculation of remaining fuel safety margin for said aircraft.

79. The system defined in claim 53, wherein said control station further comprises:

(3) a display device coupled to at least one of said first logic device for displaying said traffic control instructions; and
(4) a supervisory input device, coupled to at least one of said first logic device;
and wherein a supervising person (1) observes said traffic control instructions generated by said at least one first logic device, and (2) may override the decision of said at least one first logic device by inputting overriding instructions to said supervisory input device.

80. A system for supervising the landing of a plurality of aircraft at an airfield by a human supervisor in a control station, each of said aircraft able to be controlled without any human personnel on board, said system comprising, in combination:
(a) a control station comprising:
    (1) at least one input device, responsive to said supervisor, for producing at least one air traffic control signal for controlling the order of landing of said plurality of aircraft; and
    (2) a transmitting device, coupled to said at least one input device, for electronic communication with each of a plurality of aircraft; and
(b) aircraft control apparatus disposed on each of a plurality of aircraft, each said apparatus including:
    (1) a receiving device for electronic communication with said transmitting device of said control station;
    (2) at least one logic device, coupled to said receiving device, for controlling said aircraft by controlling at least one of the movable aerodynamic control surfaces of the aircraft, throttles, landing gear, and brakes, said logic device being operable to pilot said aircraft to the vicinity of said airfield, said logic device also being operable to cause said aircraft to fly along one of a plurality of paths in the vicinity of said airfield in order to delay said landing;
wherein
(1) said at least one control signal is a landing command, selected by means of said input device by said supervisor, based on said supervisor's observations of said plurality of aircraft;
(2) said landing command is transmitted from said control station to the respective logic device on at least one of said plurality of aircraft; and
(3) in response thereto, said respective logic device causes said one aircraft to fly along one of said plurality of paths and causes said one aircraft to leave said path to land;
thereby to control the timing of landing said aircraft; and
thereby to control the sequence of aircraft landings among said plurality of aircraft.

81. The system defined in claim 80, wherein said path is at least one of:
(a) a circular orbit defined by the altitude, the radius and the spatial coordinates of the center of said circular orbit;
(b) an elliptical orbit defined by the altitude, the ellipticity, and the spatial coordinates of each of the foci of said elliptical orbit;
(c) a route defined by the spatial coordinates of each of a sufficiently large number of points along said route to substantially define said route; and
(d) a pre-defined orbital pattern.

82. The system defined in claim 80, wherein following the transmission of said landing command, at least one further control signal is transmitted from said control station to said respective logic device for remotely piloting said one aircraft;
thereby to allow the supervisor to fully control the landing of said respective aircraft.

83. The system defined in claim 80, wherein at least one of said plurality of aircraft is operable to be controlled by a human pilot located at a pilot station remote therefrom, and wherein following the transmission of said control signal, at least one additional control signal is transmitted from said pilot station to said respective logic device on said one aircraft for remotely piloting said one aircraft;
thereby to allow said remote human pilot to fully control the landing of said one respective aircraft.

84. The system defined in claim 80, wherein one of said at least one logic devices is further operative to automatically land its respective aircraft at said airfield following the receipt of a landing confirmation command.

85. A system for supervising the landing of a plurality of aircraft at an airfield by a control device in a control station, each of said aircraft able to be controlled without any human personnel on board, said system comprising, in combination:
(a) a control station comprising:
    (1) a first transmitting/receiving (T/R) device for electronic communication with each of a plurality of aircraft; and
    (2) at least one first logic device, coupled to said first T/R device, for
        (i) analysis of received aircraft information, for the computation of prioritizing information for determining the sequence of landing of said plurality of aircraft; and
        (ii) producing at least one control signal for each of said plurality of aircraft; and
(b) aircraft control apparatus disposed on each of a plurality of aircraft, each said apparatus including:
    (1) a second T/R device for electronic communication with said first T/R device of said control station;
    (2) at least one second logic device, coupled to said second T/R device, for controlling said aircraft by controlling at least one of the movable aerodynamic control surfaces of the aircraft, throttles, landing gear, and brakes, said second logic device being operable to pilot said aircraft to the vicinity of said airfield, said second logic device also being operable to cause said aircraft to fly in along of a plurality of paths in the vicinity of said airfield in order to delay said landing; and
    (3) at least one telemetry device, coupled to said second T/R device, for obtaining said aircraft information;
wherein
(1) said at least one control signal is a landing command, selected by said first logic device, based on said received aircraft information;
(2) said landing command is transmitted from said control station to the respective second logic device on at least one of said plurality of aircraft; and
(3) in response thereto, said respective second logic device causes said one aircraft to fly along one of said plurality of paths and causes said one aircraft to leave said path to land;
thereby to control the timing of landing said aircraft; and
thereby to control the sequence of aircraft landings among said plurality of aircraft.

86. The system defined in claim 85, wherein said path is at least one of:
(a) a circular orbit defined by the altitude, the radius and the spatial coordinates of the center of said circular orbit;
(b) an elliptical orbit defined by the altitude, the ellipticity, and the spatial coordinates of each of the foci of said elliptical orbit;

(c) a route defined by the spatial coordinates of each of a sufficiently large number of points along said route to substantially define said route; and
(d) a pre-defined orbital pattern.

87. The system defined in claim 85, wherein following the transmission of said landing command, at least one further control signal is transmitted from said control station to said respective second logic device for remotely piloting said one aircraft;

thereby to allow the first logic device to fully control the landing of said one respective aircraft.

88. The system defined in claim 85, wherein at least one of said plurality of aircraft is operable to be controlled by a human pilot located at a pilot station remote therefrom, and wherein following the transmission of said control signal, at least one additional control signal is transmitted from said pilot station to said respective second logic device on said one aircraft for remotely piloting said one aircraft;

thereby to allow said remote human pilot to fully control the landing of said respective aircraft.

89. The system defined in claim 85, wherein one of said at least one second logic devices is further operative to automatically land said its respective aircraft at said airfield following the receipt of a landing confirmation command.

* * * * *